United States Patent
Hydock

(10) Patent No.: US 7,013,609 B2
(45) Date of Patent: Mar. 21, 2006

(54) MODULAR RADIANT HEAT PANEL SYSTEM

(76) Inventor: Gary J. Hydock, 13199 Parker Rd., Holland, NY (US) 14080

( * ) Notice: Subject to any disclaimer, the term of this patent is extended or adjusted under 35 U.S.C. 154(b) by 306 days.

(21) Appl. No.: 10/087,318

(22) Filed: Mar. 1, 2002

(65) Prior Publication Data

US 2003/0163965 A1    Sep. 4, 2003

(51) Int. Cl.
  *E04C 2/52* (2006.01)
(52) U.S. Cl. .................................. 52/220.1; 165/49
(58) Field of Classification Search ............... 52/406.2, 52/407.5, 414, 480, 607, 309.8, 403.1, 342, 52/220.1, 220.2, 220.3, 745.4, 684, 712; 219/213; 165/49, 48.2, 168, 169, 47
  See application file for complete search history.

(56) References Cited

U.S. PATENT DOCUMENTS

| | | | | |
|---|---|---|---|---|
| 2,726,593 A | * | 12/1955 | Lahti | |
| 4,212,348 A | * | 7/1980 | Kobayashi | 165/49 |
| 4,338,995 A | * | 7/1982 | Shelley | 165/49 |
| 4,635,710 A | * | 1/1987 | Shelley | 165/49 |
| 4,766,951 A | * | 8/1988 | Bergh | 165/56 |
| 4,865,120 A | * | 9/1989 | Shiroki | 165/56 |
| 5,078,203 A | * | 1/1992 | Shiroki | 165/56 |
| 5,415,155 A | * | 5/1995 | Cohen et al. | 126/663 |
| 5,454,428 A | | 10/1995 | Pickard et al. | |
| 5,550,350 A | * | 8/1996 | Barnes | 219/213 |
| 5,598,682 A | | 2/1997 | Haughian | |
| 5,862,854 A | * | 1/1999 | Gary | 165/55 |
| 6,021,646 A | * | 2/2000 | Burley et al. | 62/235 |
| 6,283,382 B1 | * | 9/2001 | Fitzemeyer | 237/69 |

FOREIGN PATENT DOCUMENTS

JP    2003-336305    * 5/2002

* cited by examiner

*Primary Examiner*—Gwendolyn Baxter
(74) *Attorney, Agent, or Firm*—Phillips Lytle LLP

(57) ABSTRACT

The invention is directed to modular radiant heat panel system. In the preferred embodiment, the system comprises multiple radiant heat transfer panels (16), each of the panels having a thermal mass (18) and a conduit channel (20); a fluid conduit (21), the conduit communicating with an apparatus (23) for heating fluid (22) in the conduit; the multiple panels positioned adjacent each other such that the conduit extends through a series of the conduit channels; the panels, conduit and apparatus so configured and arranged to permit heat transfer from the fluid to the thermal mass of the panel, whereby heat radiates from the panel. The present invention also discloses a radiant heat transfer panel for engagement with a fluid conduit comprising: a formed tray (24); the tray defining a thermal volume (17) and a conduit channel; the volume containing a thermal mass; and the channel, volume and thermal mass configured and arranged to permit heat transfer between the conduit and the thermal mass. The invention also discloses a method for installing a modular radiant heat panel system comprising the steps of: providing an under-layer having a given area (44); providing multiple panels having a thermal mass and a conduit channel; providing conduit; position the conduit over or under the under-layer in a predetermined pattern; and positioning the panels on or under the under-layer such that the conduit extends through at least a portion of the conduit channel of the panels.

8 Claims, 16 Drawing Sheets

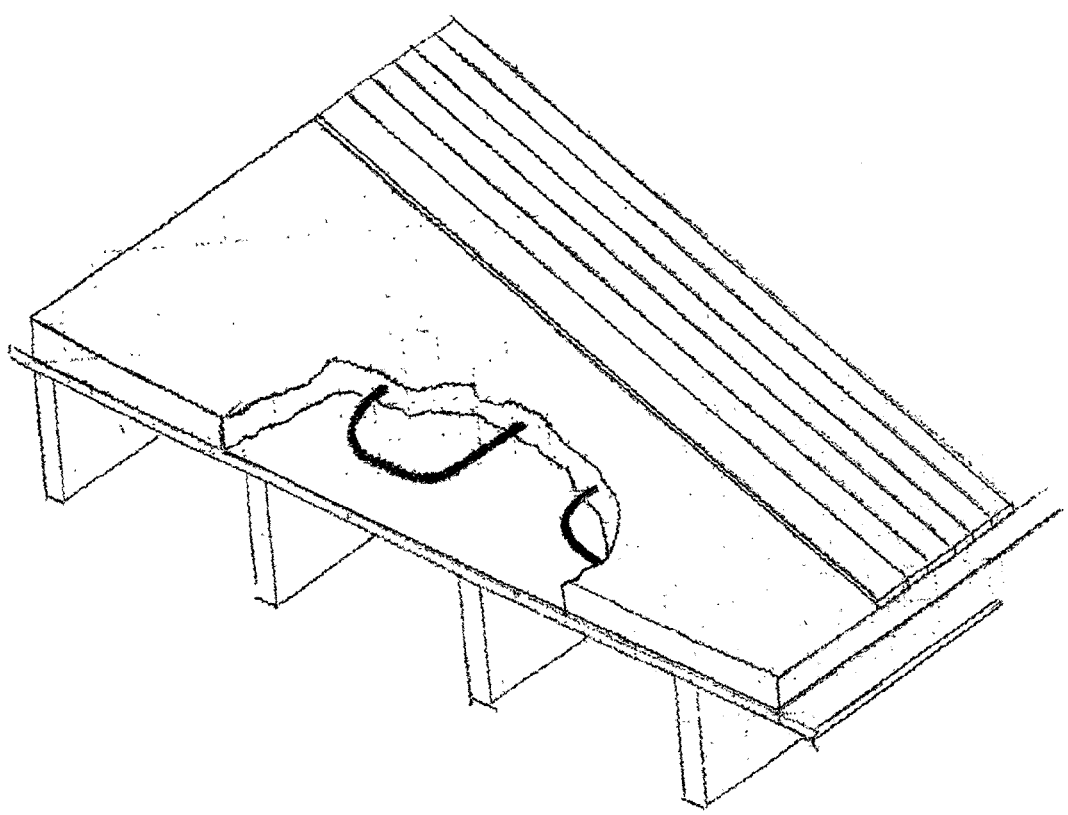

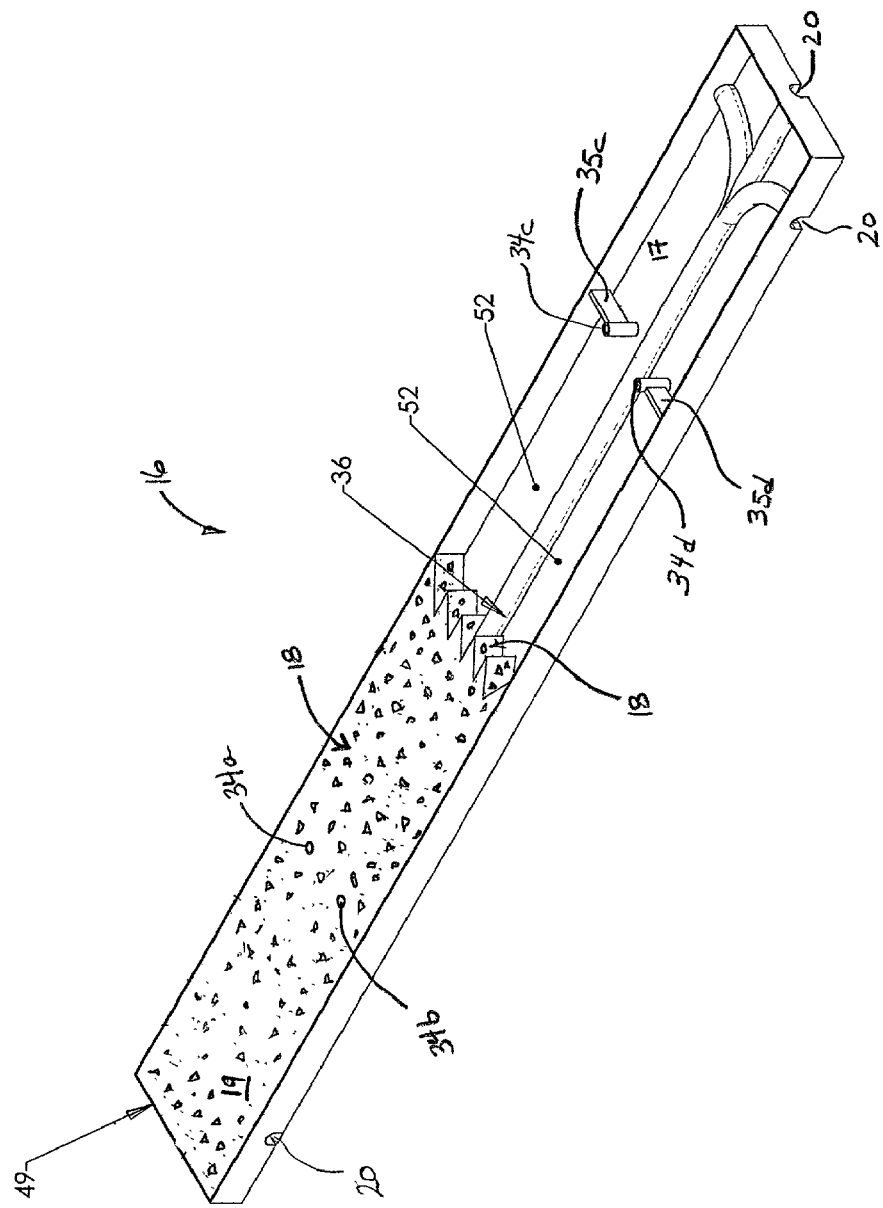

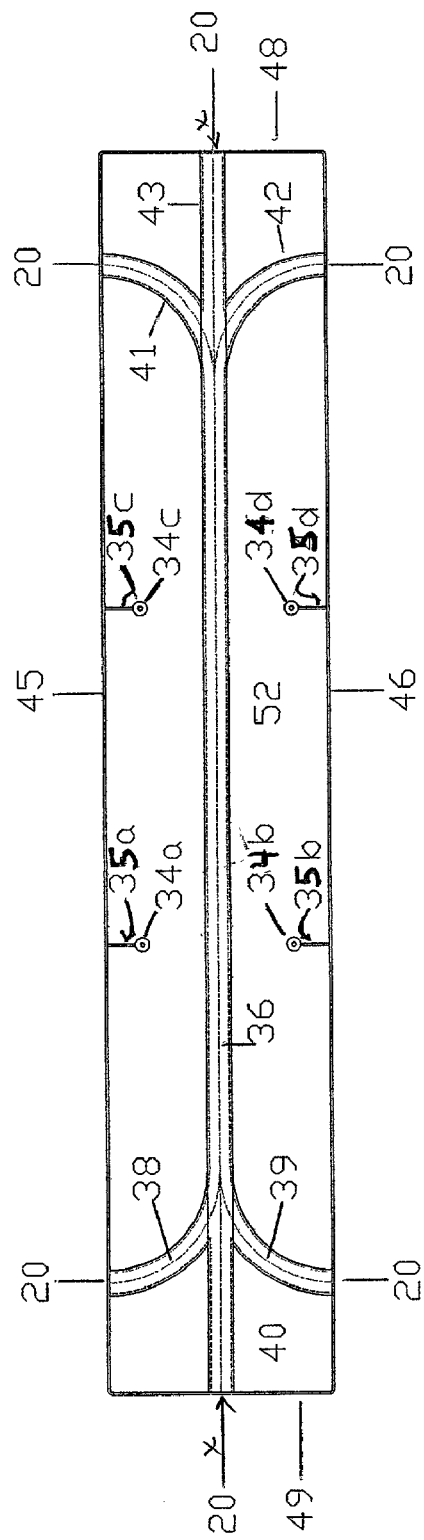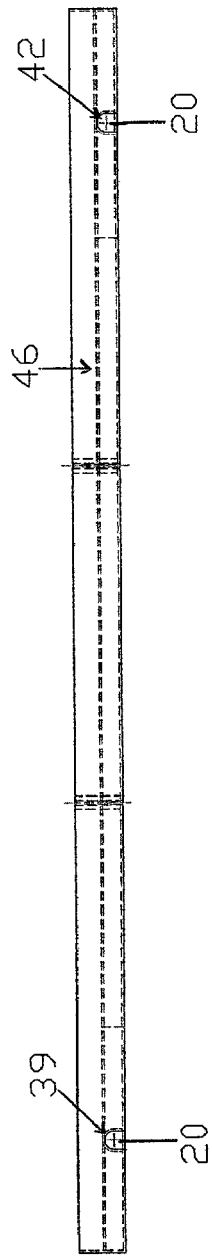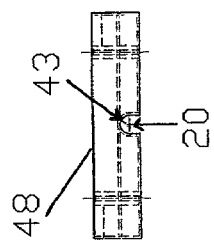

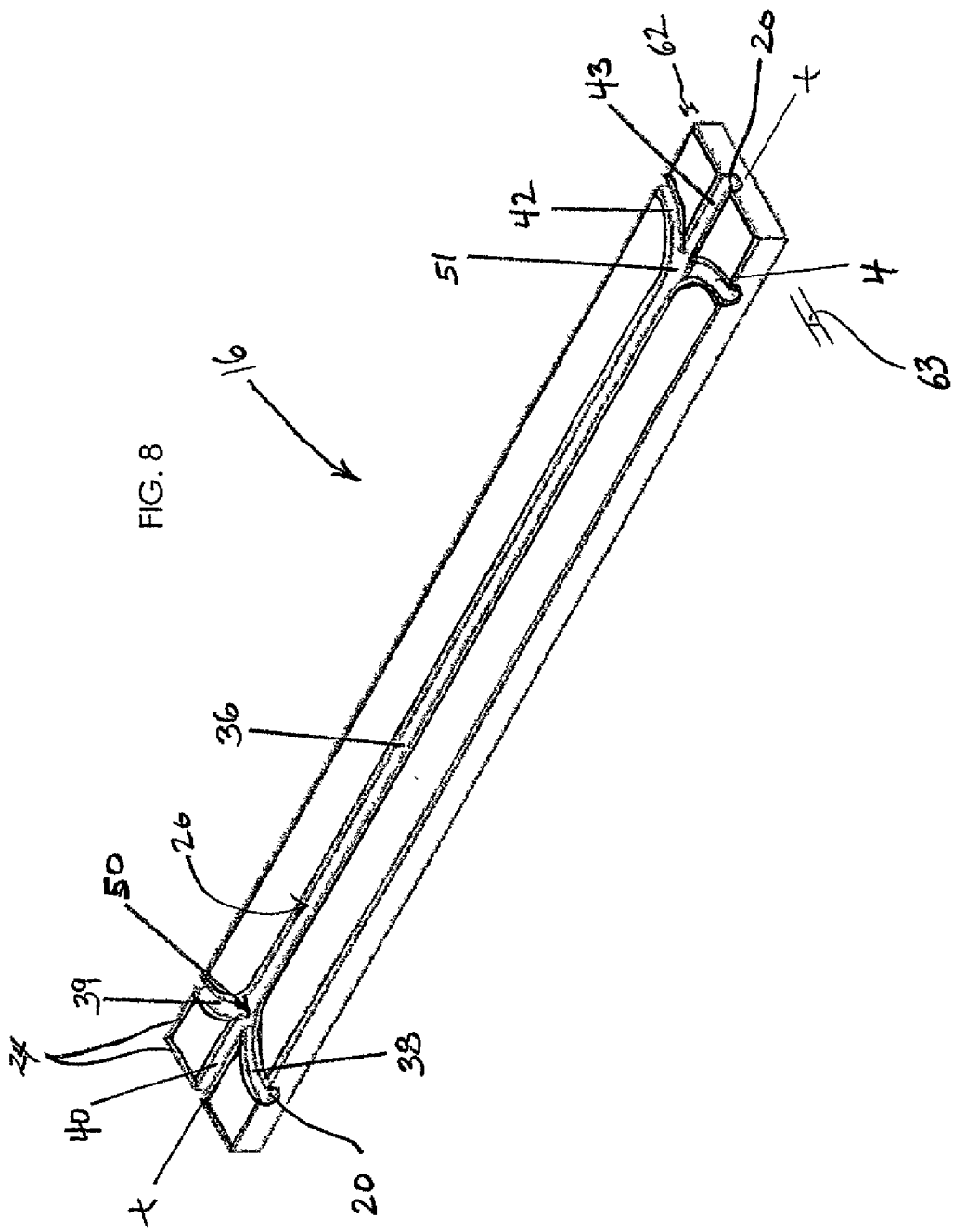

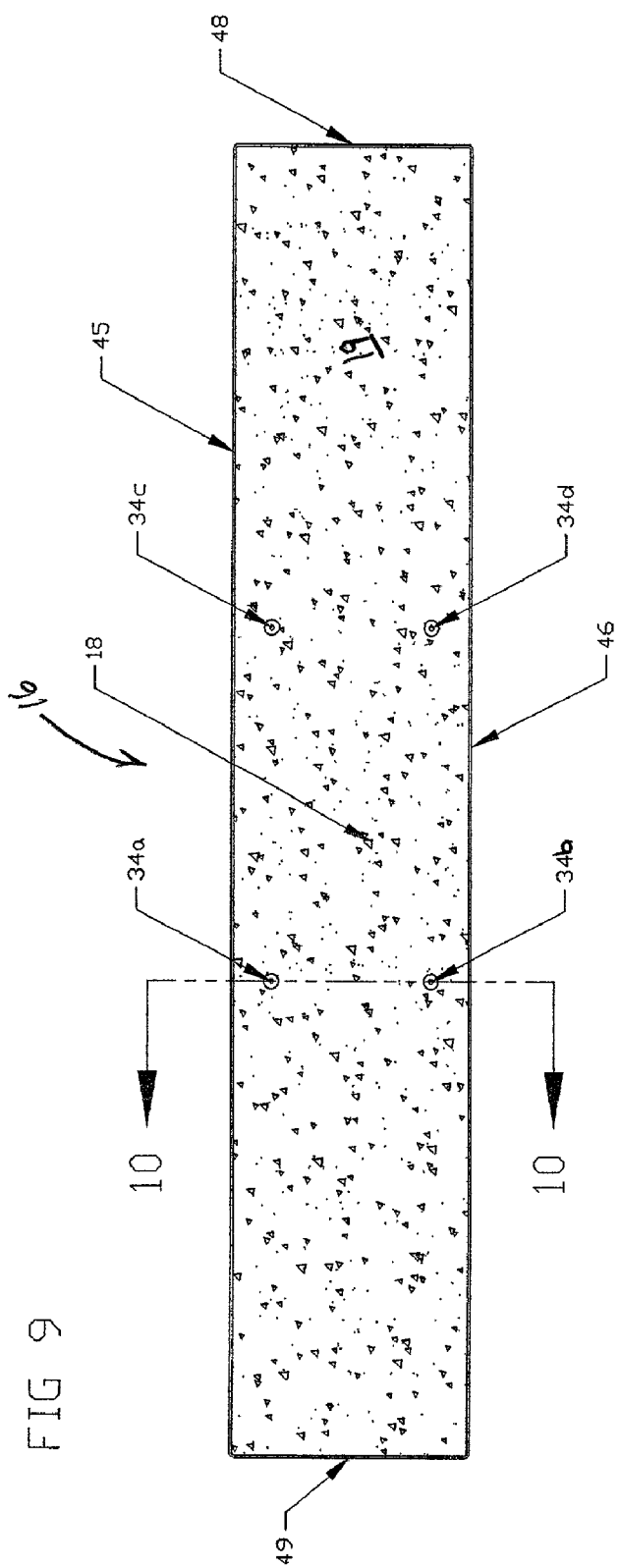
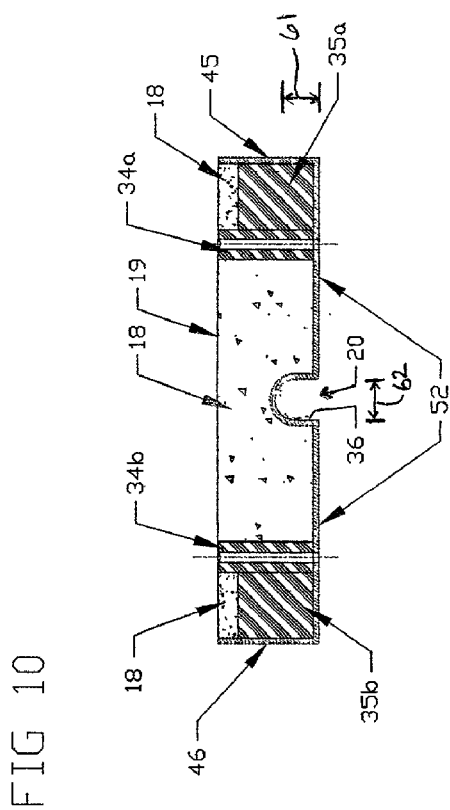
FIG 9
FIG 10

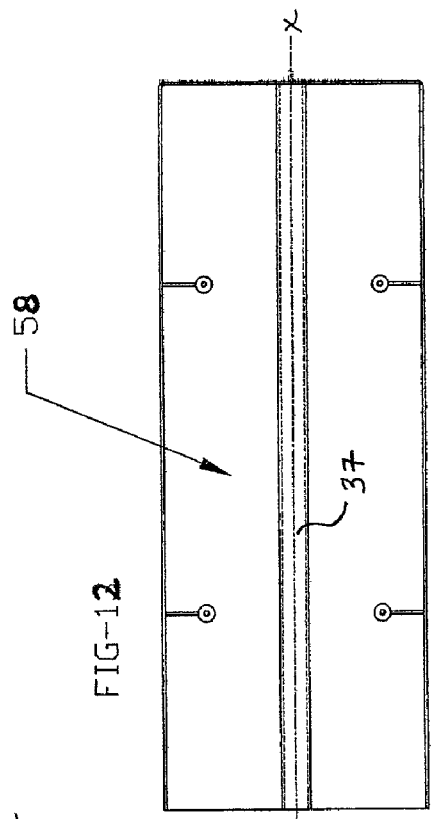
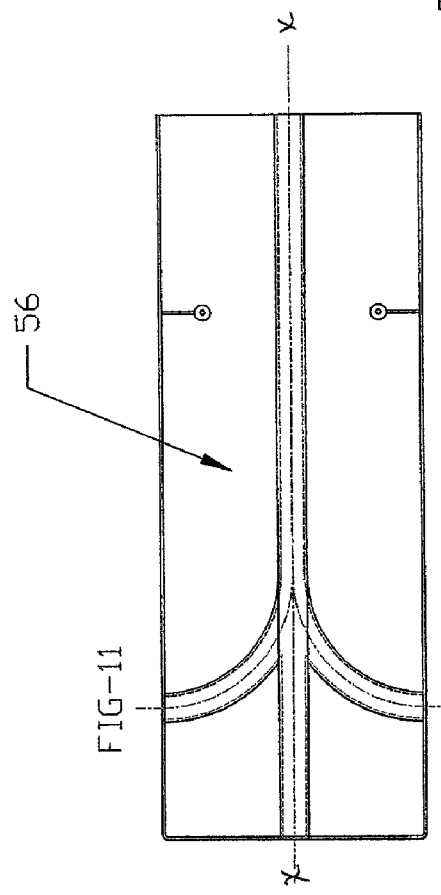
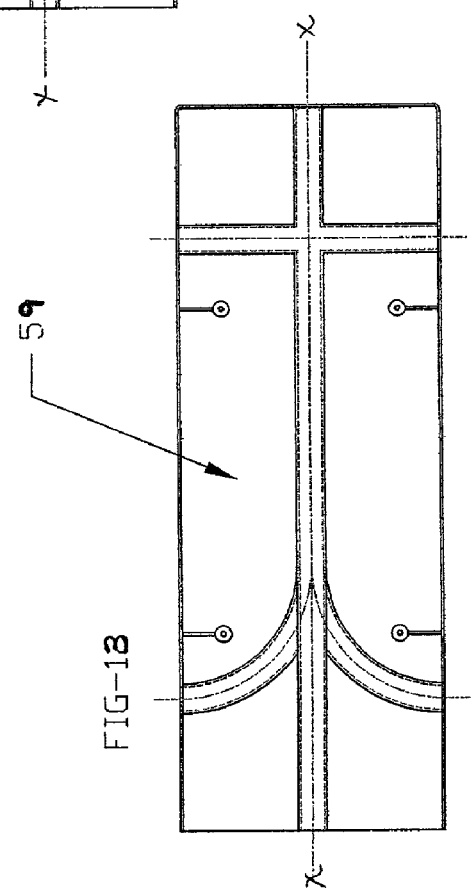

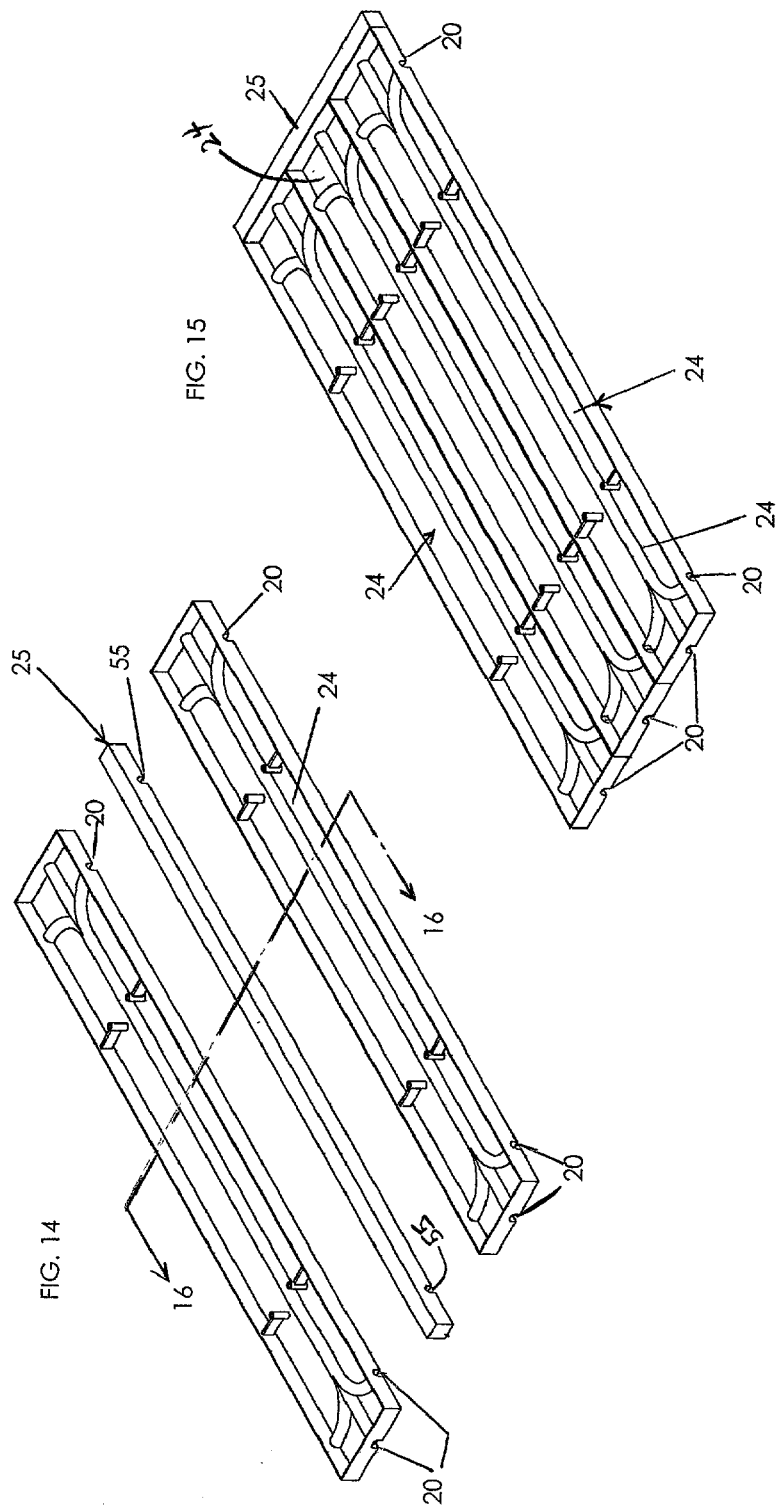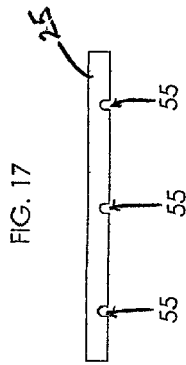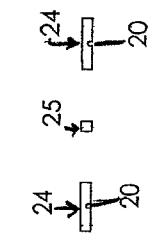

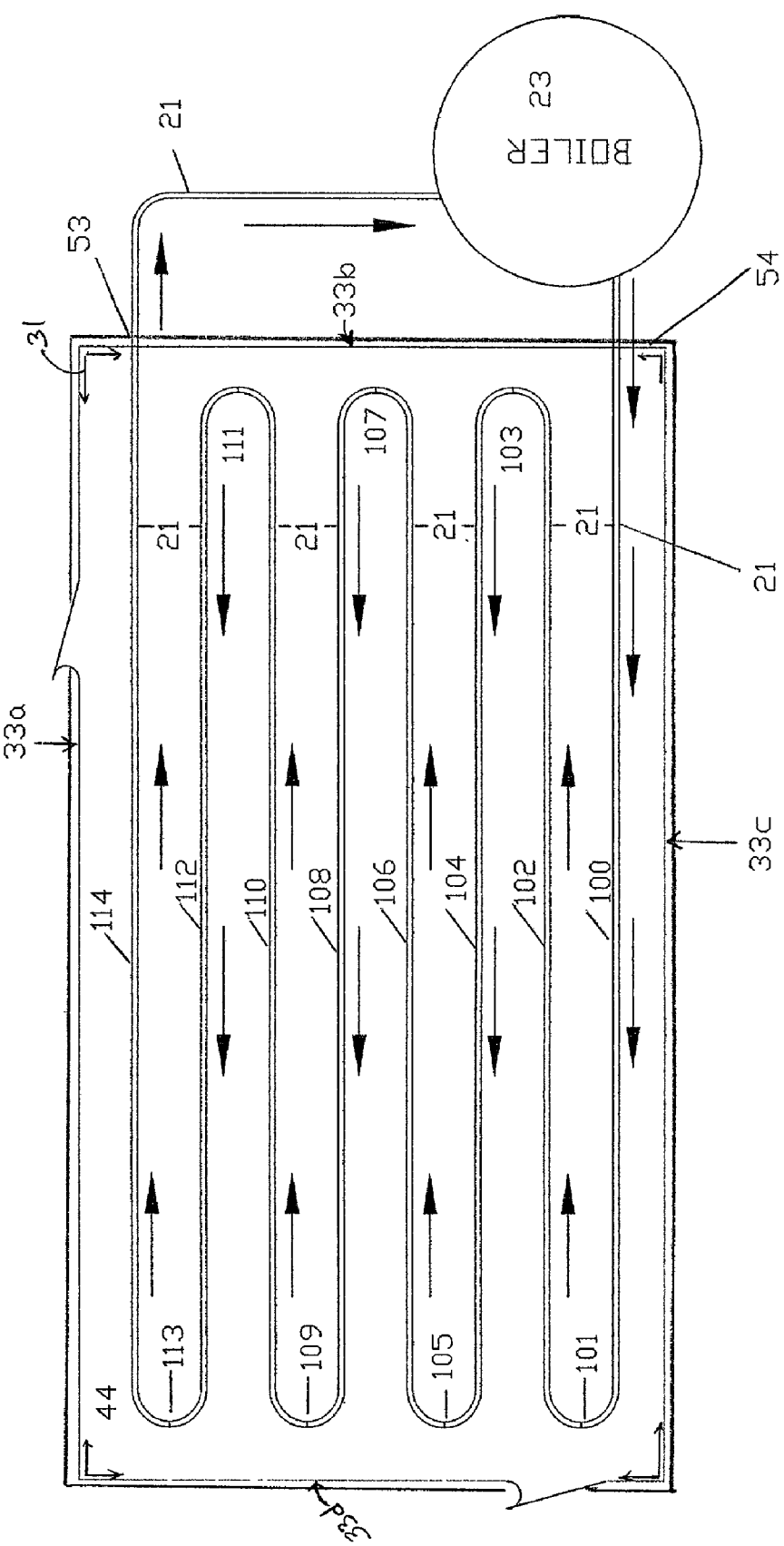

MODULAR RADIANT HEAT PANEL SYSTEM

TECHNICAL FIELD

The present invention relates generally to the field of in-floor radiant heating systems and, more particularly, to a new modular radiant heat panel system.

BACKGROUND ART

Hydronic in-floor radiant heat systems are known in the prior art. Such radiant heating systems utilize tubing within a floor structure to carry and disburse heat through the floor without any visible radiators or heating grills. They generally do so by embedding tubing in a single continuous horizontal concrete slab poured below the finished flooring. Warm water is then circulated through the tubing and the heat in the circulated fluid flowing through the tubing is transferred to the concrete slab by conduction. The concrete stores and radiates the heat, thereby warming objects in the room, rather than the air in the room, which can be more cost effective and can reduce heat loss.

It is known that such systems can be formed by providing a subfloor, running tubing over the subfloor, and then pouring a single continuous concrete or gypsum slab, such as Maxxon Corporation's THERMA-FLOOR®, around and over the tubing. A synthetic material is generally used for the tubing, such as polyethylene or polybutylene, which has the advantage of not expanding and contracting with fluxuations in temperature. When the concrete or gypsum hardens, it acts as the thermal mass for the system. The concrete or gypsum underlayment or slab is poured in liquid form across the entire surface area and cures to encase the tubing.

However, such systems have a number of drawbacks. First, the equipment required to pour the concrete slab is extensive and the process for installing the slab involves pumping the concrete through an elaborate delivery system, often at great effort and expense. Second, delays in construction are necessary to allow the concrete slab to set-up or cure. Third, the choice of materials that may be used as the thermal slab are limited. Fourth, the conditions in which the concrete slab cures or is formed varies from job site to job site and is dependent in large part on weather conditions. This can result in variations in the strength and characteristics of the slab. Fifth, because the underlayment is a continuous planar slab, if there is leakage in the piping or problems with the subfloor, the entire slab must be removed and replaced. Sixth, it is often difficult to properly align and then maintain the alignment of the piping when the slab is being poured and is curing.

Hence, it would be useful to provide a radiant heat system which allows for quick and easy installation, uniform characteristics and strength in the underlayment, uniform fabrication, options in the characteristics of the underlayment, greater standardization, and easy repair.

DISCLOSURE OF THE INVENTION

With parenthetical reference to the corresponding parts, portions or surfaces of the disclosed embodiment, merely for the purposes of illustration and not by way of limitation, the present invention provides an improved radiant heat transfer system (15) comprising: multiple radiant heat transfer panels (16), each of the panels having a thermal mass (18) and a conduit channel (20); a fluid conduit (21), the conduit communicating with an apparatus (23) for heating fluid (22) in the conduit; the multiple panels positioned adjacent each other such that the conduit extends through a series of the conduit channels; the panels, conduit and apparatus so configured and arranged to permit heat transfer from the fluid to the thermal mass of the panel, whereby heat radiates from the panel.

The system may further comprise an attachment spacer (25) and an edge spacer (26) which may be made of wood or a composite material. The system may further comprise an over-layer (28) and/or an under-layer (29). The over-layer may have a finished surface and may be selected from a group consisting of wood, carpet, tile or laminate. The panel may be attached to the under-layer by a mechanical bond or by a mechanical fastener and the over-layer may be attached to the attachment spacer or the edge spacer by a mechanical fastener. The system may further comprise a wall, the multiple panels may define an outer perimeter (31), the wall (33) may define an inner perimeter (32), and the edge spacer may be positioned between the outer perimeter and the inner perimeter. The panel may have an outer surface which may define a floor, wall or ceiling.

The present invention also discloses a radiant heat transfer panel for engagement with a fluid conduit comprising: a formed tray (24); the tray defining a thermal volume (17) and a conduit channel; the volume containing a thermal mass; and the channel, volume and thermal mass configured and arranged to permit heat transfer between the conduit and the thermal mass. The conduit may be plastic tubing and the tray may comprise a composition selected from the group consisting of polyvinyl chloride, polyethylene, polybutylene or thermoplastic material. The tray may comprise a fixture tower (34) and a side gusset (35). The conduit channel may be a U-shaped trough, may be cylindrical, and may comprise a linear section (36) and/or an arcuate section (38). The thermal mass may comprise a composition selected from the group consisting of cement, mortar, ceramic, concrete or stone, and may have an outer surface that is textured or is a finished flooring surface.

The invention also discloses a radiant heat transfer panel (60) for engagement with a conduit comprising: a thermal mass; the thermal mass having an outer surface (64) and a conduit channel (63); the thermal mass and the conduit channel configured and arranged to permit heat transfer between the conduit and the thermal mass; whereby heat radiates from the panel.

The invention also discloses a method for installing a modular radiant heat panel system comprising the steps of: providing an under-layer having a given area (44); providing multiple prefabricated thermal panels having a thermal mass and a conduit channel; providing conduit; position the conduit over the under-layer in a predetermined pattern; and positioning the panels on the under-layer such that the conduit extends through at least a portion of the conduit channel of the panels.

The method may further comprise the steps of attaching the panel to the under-layer, attaching the conduit to an apparatus for heating fluid flowing through the conduit, using a filler substance to fill a fault or irregularity in the under-layer, positioning an over-layer over the panels, providing an attachment spacer and positioning the attachment spacer adjacent to at least one of the panels, attaching the attachment spacer to the under-layer, providing an over-layer, and/or attaching the over-layer to the attachment spacer.

Accordingly, the general object of the present invention is to provide an improved radiant heat system in which modular panels are used to create the thermal mass for the system.

Another object of the invention is to provide an improved radiant heating system in which the thermal mass is lightweight.

Another object of the invention is to provide an improved radiant heating system in which the thermal mass is composed of a fire resistant cementitious material.

Another object of the invention is to provide an improved radiant heating system in which the thermal mass is water resistant.

Another object of the invention is to provide an improved radiant heating system in which the thermal mass provides sound deadening characteristics.

Another object of the invention is to provide a radiant heating system which requires less equipment, labor and time to install.

Another object of the invention is to provide an improved radiant heating system in which the thermal mass provides a predetermined and uniform routing channel for the tubing.

Another object of the invention is to provide an improved radiant heating system in which the thermal mass is cured prior to installation and remotely from the installation site.

Another object of the invention is to provide an improved radiant heating system in which the thermal mass may be installed regardless of work site conditions such as temperature or humidity.

Another object of the invention is to provide an improved radiant heating system in which the strength characteristics of the thermal mass may be standardized by controlling the conditions under which the thermal mass is poured, formed and cured.

Another object of the invention is to provide an improved radiant heating system in which the thermal mass is formed under highly controlled curing and pouring conditions.

Another object of the invention is to provide an improved radiant heating system in which the thermal mass operates as a finished floor after installation.

Another object of the invention is to provide an improved radiant heating system in which the top surface of the thermal mass is of finished quality.

Another object of the invention is to provide an improved radiant heating system in which the top surface of the thermal mass may have different finishes, shades, textures, preparations, coatings, colors, treatments or ornamental features.

Another object of the invention is to provide an improved radiant heating system in which preformed modular panels of different shapes comprise the thermal mass.

Another object of the invention is to provide an improved radiant heating system in which the thermal mass is mixed, cured, tested and analyzed prior to installation and under controlled conditions.

Another object of the invention is to provide an improved radiant heating system which allows for simplified repair of discreet portions of the system.

Another object of the invention is to provide an improved radiant heating system which may be installed in existing structures without substantial structural modification.

Another object of the invention is to provide an improved radiant heating system in which finished flooring may be installed over the thermal mass.

Another object of the invention is to provide an improved radiant heating system in which finished flooring may be attached to the thermal mass by a mechanical or chemical bond.

Another object of the invention is to provide an improved radiant heating system in which the thermal mass is composed of a number of easily manipulated panels.

Another object of the invention is to provide an improved radiant heating system having a panel with numerous possible tube-routing combinations.

Another object of the invention is to provide an improved radiant heating system in which the thermal mass may vary widely in material composition.

Another object of the invention is to provide an improved radiant heating system which may be used indoors or outdoors.

Another object of the invention is to provide an improved radiant heating system which may be used in flooring, walls and ceilings.

Another object of the invention is to provide an improved radiant heating system having plastic encapsulation of plastic tubing.

Another object of the invention is to provide an improved radiant heating system which does not add moisture to the work site on installation.

Another object of the invention is to provide an improved radiant heating system which does not require construction delays to allow for curing of the thermal mass.

Another object of the invention is to provide an improved radiant heating system which allows for guaranteed batch analysis of the thermal mass.

Another object of the invention is to provide a modular panel with an internal form for shaping the thermal mass.

Another object of the invention is to provide a panel having an internal form with features that allow for connection to an under-layer.

Another object of the invention is to provide a radiant heat transfer panel having an internal form with features that allow for bonding with thermal mass material.

Another object of the invention is to provide a method for installing a radiant heat system.

These and other objects and advantages will become apparent from the foregoing and ongoing written specification, the drawings, and the appended claims.

DESCRIPTION OF THE PREFERRED EMBODIMENTS

Figure 2:
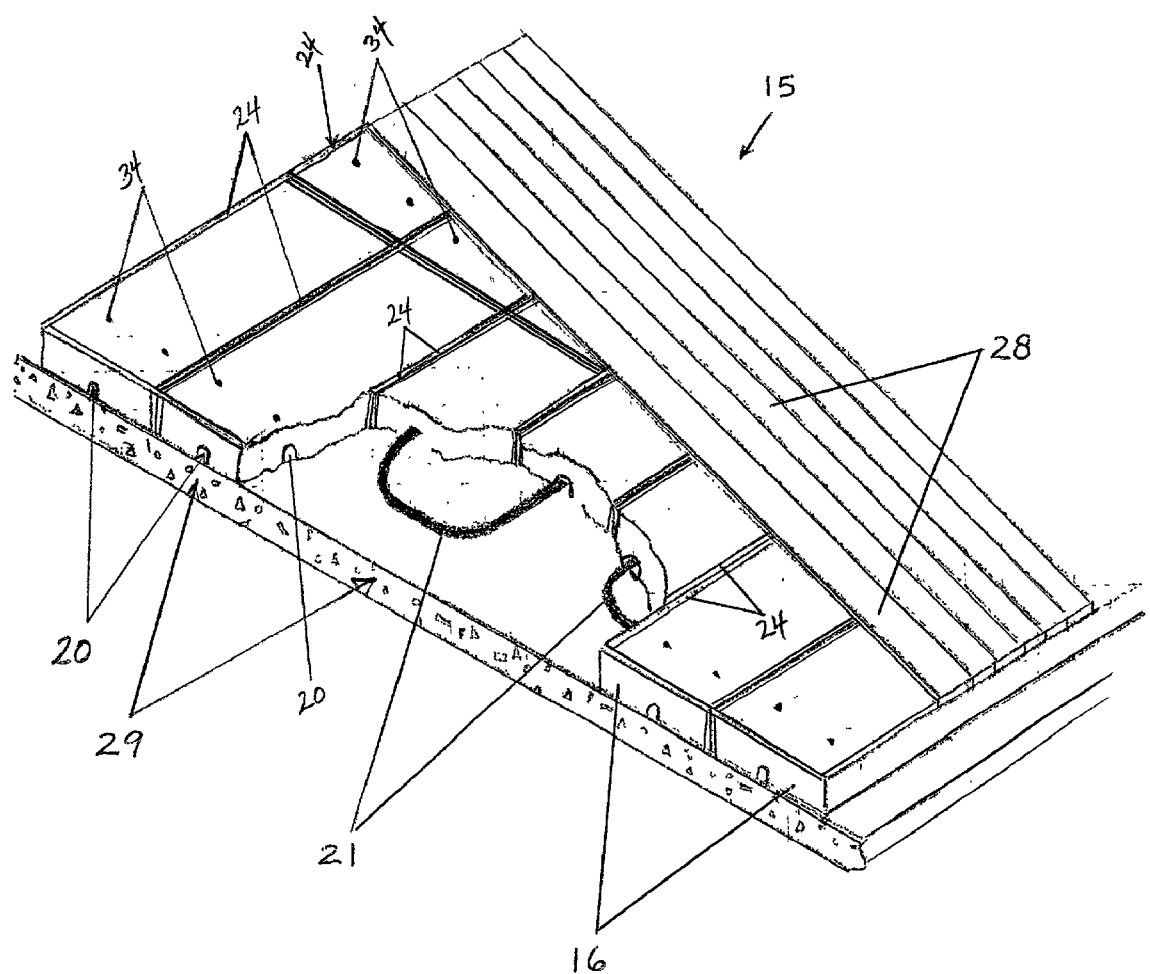
FIG. 2 is a fragmentary sectional perspective view of Applicant's improved modular radiant heat panel system.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 2 thereof, this invention provides an improved modular radiant heat panel system, of which the presently preferred embodiment is generally indicated at 15. The system is shown as broadly including an under-layer 29, multiple radiant heat transfer panels 16, conduit 21 winding through certain of conduit channels 20 in panels 16, and an over-layer 28. In the embodiment shown in FIG. 2, over-layer 28 is tongue and groove wood flooring positioned over panels 16. However, it is contemplated that numerous other types of flooring may be employed as over-layer 28. Examples of such types of flooring include conventional carpeting, tiling, or wood laminate such as Pergo®.

Figure 3:
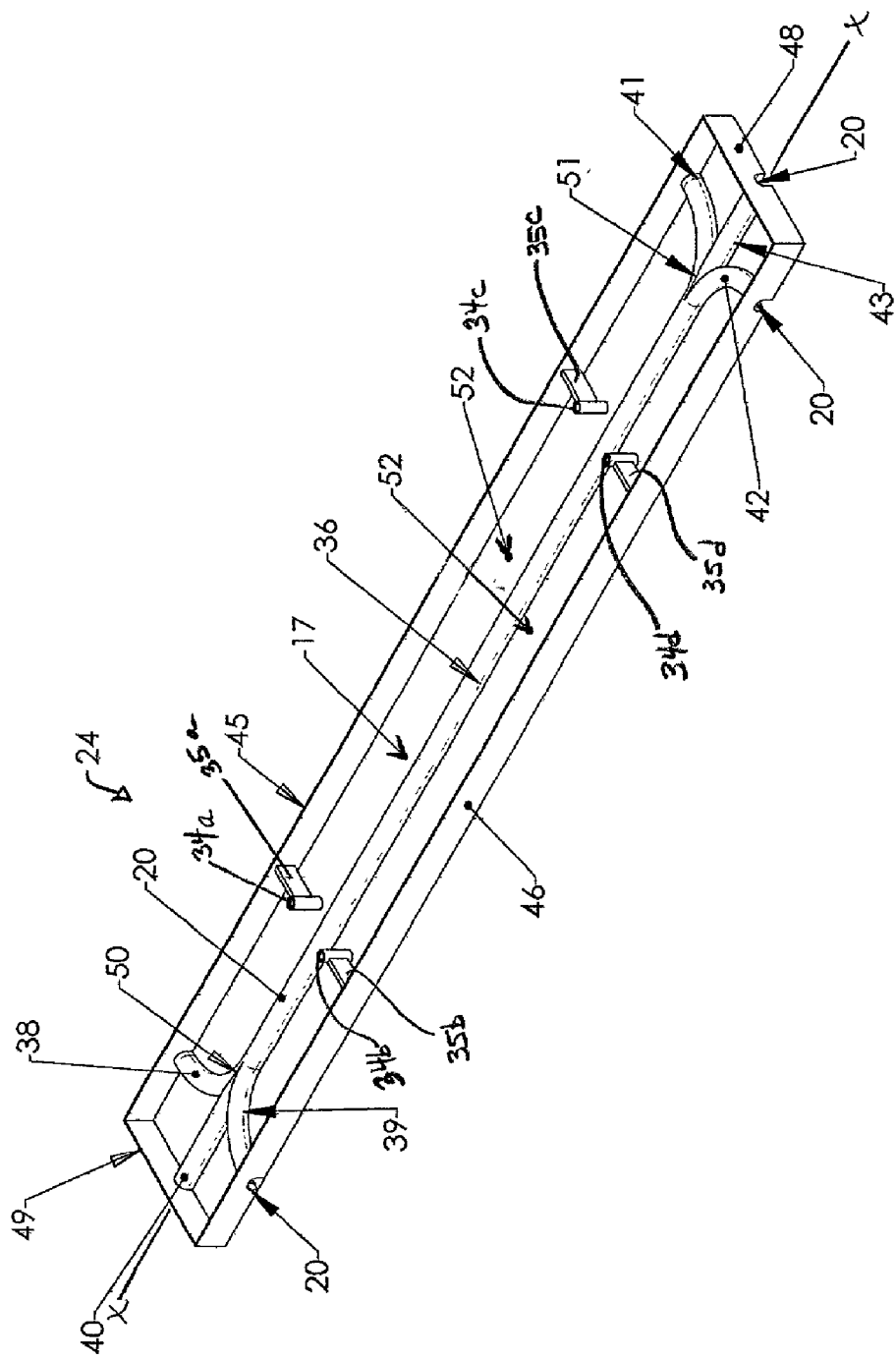
FIG. 3 is a perspective view of the tray shown in FIG. 2.
Figure 4:
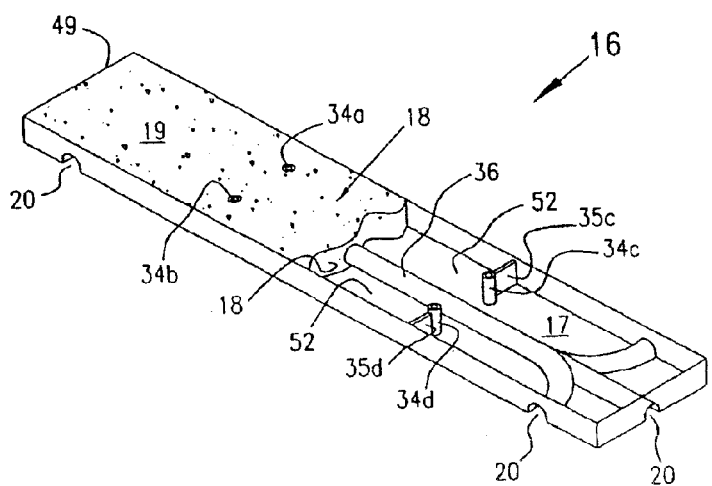
FIG. 4 is a fragmentary sectional perspective view of the thermal panel shown in FIG. 2.
Figure 5:
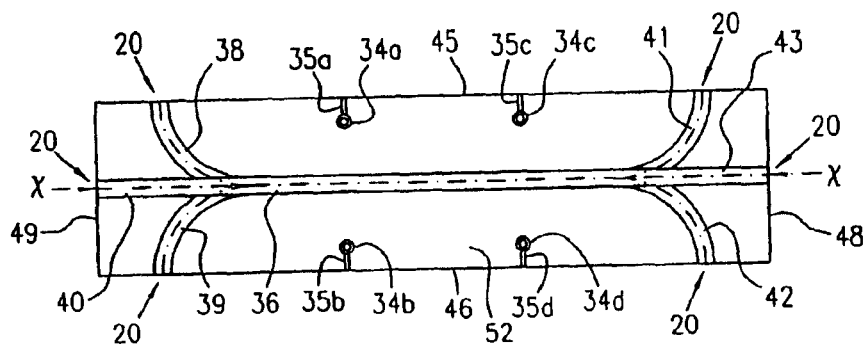
FIG. 5 is a top plan view of the tray shown in FIG. 3.
Figure 6:
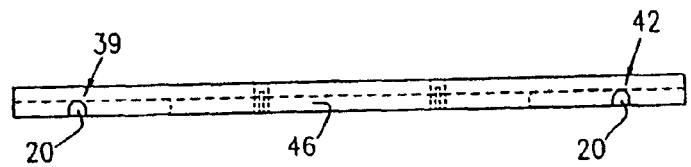
FIG. 6 is a front side elevation of the tray shown in FIG. 5.
Figure 7:
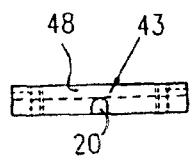
FIG. 7 is a right side elevation of the tray shown in FIG. 5.

As shown in FIG. 4, panel 16 broadly includes tray 24, conduit channels 20 and thermal mass 18. As shown in FIG. 3, tray 24 is a rectangular tray-like member generally having four vertical side-walls 45, 46, 48 and 50 and a bottom member 52. The side-walls are rear side-wall 45, front side-wall 46, right side-wall 48 and left side-wall 49. The left vertical edge of side-wall 45 is joined to the rear vertical edge of side-wall 49, the front vertical edge of side-wall 49 is joined to the left vertical edge of side-wall 46, the right vertical edge of side-wall 46 is joined to the front vertical edge of side-wall 48, and the rear vertical edge of side-wall 48 is joined to the right vertical edge of side-wall 45.

Figure 8:
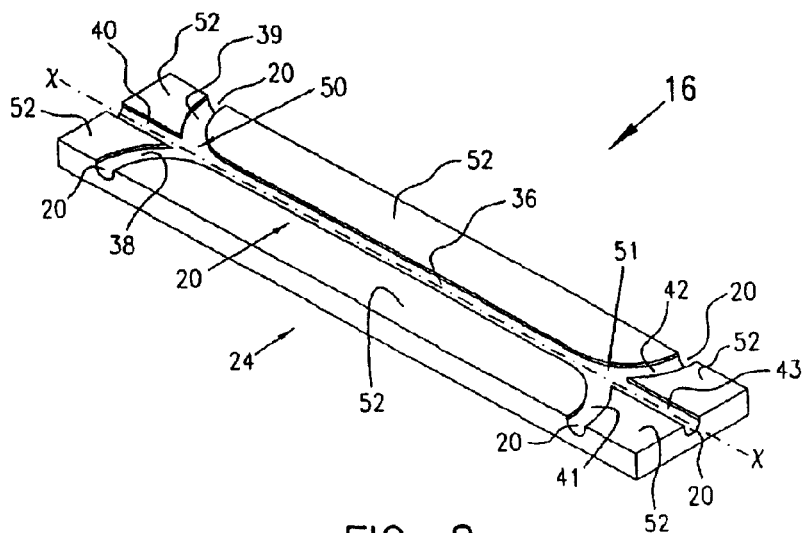
FIG. 8 is a bottom plan view of the thermal panel shown in FIG. 2.
Figure 10:
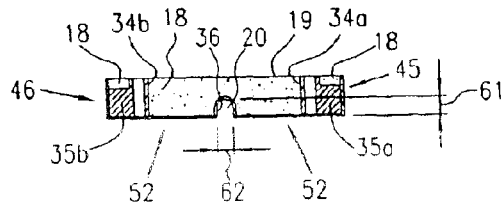
FIG. 10 is a vertical cross-sectional view of the thermal panel shown in FIG. 9, taken generally on line 10—10 of FIG. 9.

As shown in FIGS. 3 and 8, conduit channel 20 is defined by a number of interconnected upside-down U-shaped troughs 36 and 38–43. The ∩-shaped troughs are exit right trough 38, exit left trough 39, exit straight trough 40, straight trough 36, entrance right trough 41, entrance left trough 42, and entrance straight trough 43. These troughs are in open communication with each other at junctions 50 and 51, respectively, and define conduit channel 20. As shown in FIGS. 8 and 10, troughs 36 and 38–43 have a depth 61 (distance up from bottom member 52) at least as great as the diameter of conduit 21 and have a width 62 at least as great as the diameter of conduit 21. Bottom member 52 is joined to the horizontally extending edges of troughs 36, 38–43 and the bottom horizontally extending edges, respectively, of side-walls 45, 46, 48, 49. The inner surfaces of side-walls 45, 46, 48, 49, the upper surface of bottom member 52, and the upper ∩-shaped surfaces of troughs 36 and 38–43 define a thermal volume 17.

As shown in FIG. 3, tray 24 is fabricated to provide nine possible conduit channel configurations. Relative to axis x—x, these conduit combinations are flow-directed entering straight and exiting straight, flow-directed entering straight and exiting left, flow-directed entering straight and exiting right, flow-directed entering left and exiting left, flow-directed entering left and exiting straight, flow-directed entering left and exiting right, flow-directed entering right and exiting left, flow-directed entering right and exiting straight, or flow-directed entering right and exiting right.

In the preferred embodiment, tray 24 is two feet in length and six inches in width. However, as can be appreciated, the dimensions of the panels may be readily varied as required to fit a given area. The shape of the tray may also be readily varied to fit desired non-rectangular areas or to provide a non-rectangular floor pattern. Also, the thickness of the tray, and therefore the thickness of thermal mass 18, may vary depending on desired parameters.

As shown in FIGS. 3–5 and 10, tray 24 includes fixture towers 34a–34d and side gussets 35a–35d. Fixture towers 34a–34d are conventional screw towers that have a central throughbore allowing for the panel to be attached to under-layer 29 by a mechanical screw without damaging thermal mass 18. Side gussets 35a–35d extend perpendicularly from side-walls 45 and 46 to fixture towers 34a–34d, respectively. Side gussets 35a–35d support towers 34a–34d, reinforce and stiffen side-walls 45 and 46, and assist in bonding thermal mass 18 to tray 24.

Figure 11:
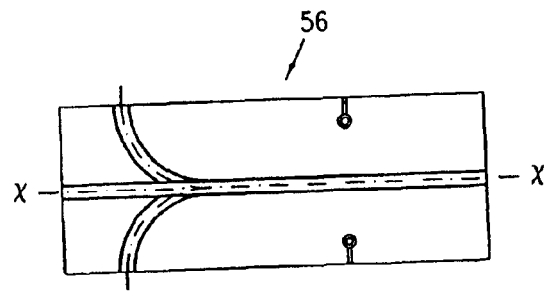
FIG. 11 is a top plan view of an alternate embodiment of the tray shown in FIG. 5.
Figure 12:
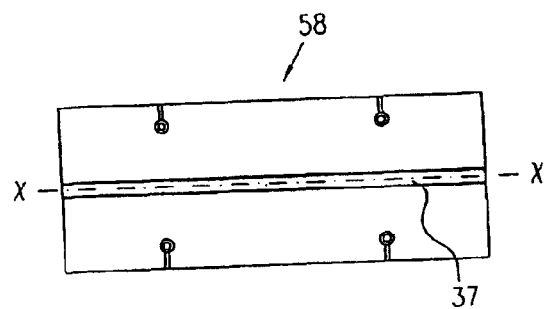
FIG. 12 is a top plan view of a second alternate embodiment of the tray shown in FIG. 5.
Figure 13:
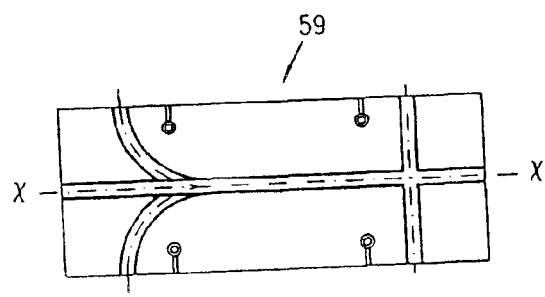
FIG. 13 is a top plan view of a third alternate embodiment of the tray shown in FIG. 5.

FIGS. 11–13 show panels having alternate conduit channel configurations. FIG. 11 shows a panel 56 having a conduit channel configuration which allows: in a first orientation, for flow-directed entering straight and exiting straight, flow-directed entering straight and exiting right, or flow-directed entering straight and exiting left; and in the opposite orientation, for flow directed entering straight and exiting straight, flow-directed entering left and exiting straight, or flow directed entering right and exiting straight. FIG. 12 shows a panel 58 having a single conduit channel configuration defined by a single straight trough 37, which only allows for a straight pass. FIG. 13 shows a panel 59 having a conduit channel configuration which allows: in a first orientation, for flow-directed entering straight and exiting straight, flow-directed entering left and exiting straight, or flow-directed entering right and exiting straight; in a second orientation, for flow-directed entering straight and exiting straight, flow-directed entering straight and exiting right, or flow-directed entering straight and exiting left; and in a third crossing orientation, for flow-directed entering left and exiting right or flow-directed entering right and exiting left. Trays 24, 56, 58 and 59 may be used interchangeably in system 15 depending on the desired routing for conduit 21. Also, while a number of configurations for conduit channel 20 have been shown and described, persons skilled in this art will appreciate that various alternative and/or additional configurations may be employed.

In the preferred embodiment, tray 24 is composed of conventional thermoplastic material formed by plastic injection molding. However, alternative molding processes may be used. For example, tray 24 may be vacuum molded. It is contemplated that tray 24 may be formed of various types of materials. Examples include polyethylene, polyamide, polycarbonate, polyethylene terephthalate, acrylonitrile butadiene styrene, polyethylene high density copolymer, high impact polystyrene, polypropylene, polypropylene copolymer, polypropylene homopolymer, and polyvinyl chloride. In addition, recycled materials, such as recycled plastic, may be used. The type of material may be varied depending on the geographic region in which the material will be used as well as desired colors and textures. In addition, the tray may be formed such that it has a rough texture which allows for increased bonding between the tray and the thermal mass.

Figure 9:
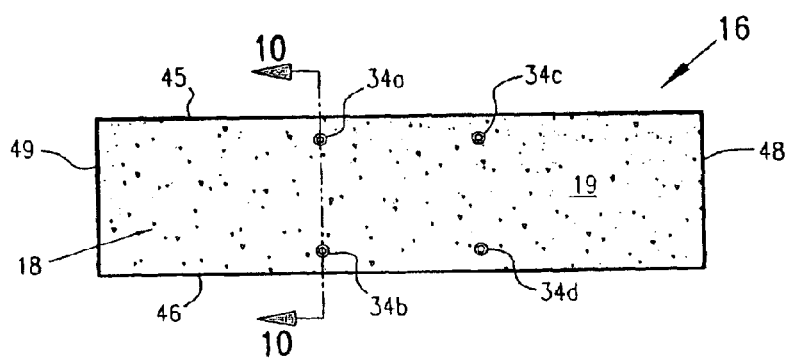
FIG. 9 is a top plan view of the thermal panel shown in FIG. 2.

As shown in FIGS. 4 and 9–10, thermal volume 17 of tray 24 is filled with thermal mass 18. In the preferred embodiment, thermal mass 18 is conventional cementitious material. It is mixed to provide for a desired weight, thermal conductivity, strength, density, absorption, fire resistance, surface coloring, surface texture and/or surface finish. The concrete mix manufactured by Pine Hill Concrete Corp. of 2255 Bailey Ave., Buffalo N.Y. 14211 may be employed in the preferred embodiment. The composition of thermal mass 18 may be readily varied to provide different weight, conductivity, strength, or surface characteristics. While the preferred embodiments employs a conventional cementitious material, it is contemplated that other material may be used as a thermal mass such as ceramic, cement, synthetic cement, synthetic gypsum, bata hemi hydrate, polystyrene, gypsum, ash, ceramic, mortar, or carbon. For example, if the system is to be installed in an existing building that is not capable of supporting heavy floor loads, the composition of the thermal mass may be designed and fabricated to be of lighter weight, depending on the carrying capacity of the structure.

Tray 16 is filled with cementitious material in a controlled indoor environment under controlled curing conditions. Tray 16 acts as the form-work for thermal mass 18. Because tray 24 is filled with cementitious material which is cured in a controlled indoor environment removed from the site at which the panels will be installed, a greater variety of choices in the composition of the thermal mass are available. Also, because the conditions under which the thermal mass is poured, formed and cures is highly controlled, the characteristics of thermal mass 18 may in turn be more easily controlled and more uniform, and the panel can be readily tested or analyzed using state of the art equipment and techniques to confirm strength, density or other design criteria prior to installation. Furthermore, panel 22 will not add moisture to the installation site.

Trays 16 are filled with thermal mass 18 by a fully automated process. Filled trays 24 are then moved to an automated palletizer, which stacks panels 16 on pallets 38 to 42 rows high. Panels 16 are allowed to cure on the pallet. A pallet can generally contain 620 square feet of panels and weigh between 1,870 and 1,932 pounds. The panels are then transported to the installation site on standard shipping pallets. The number of panels on a pallet and resulting weight of a pallet can be readily varied depending on transportation abilities.

Figure 21:
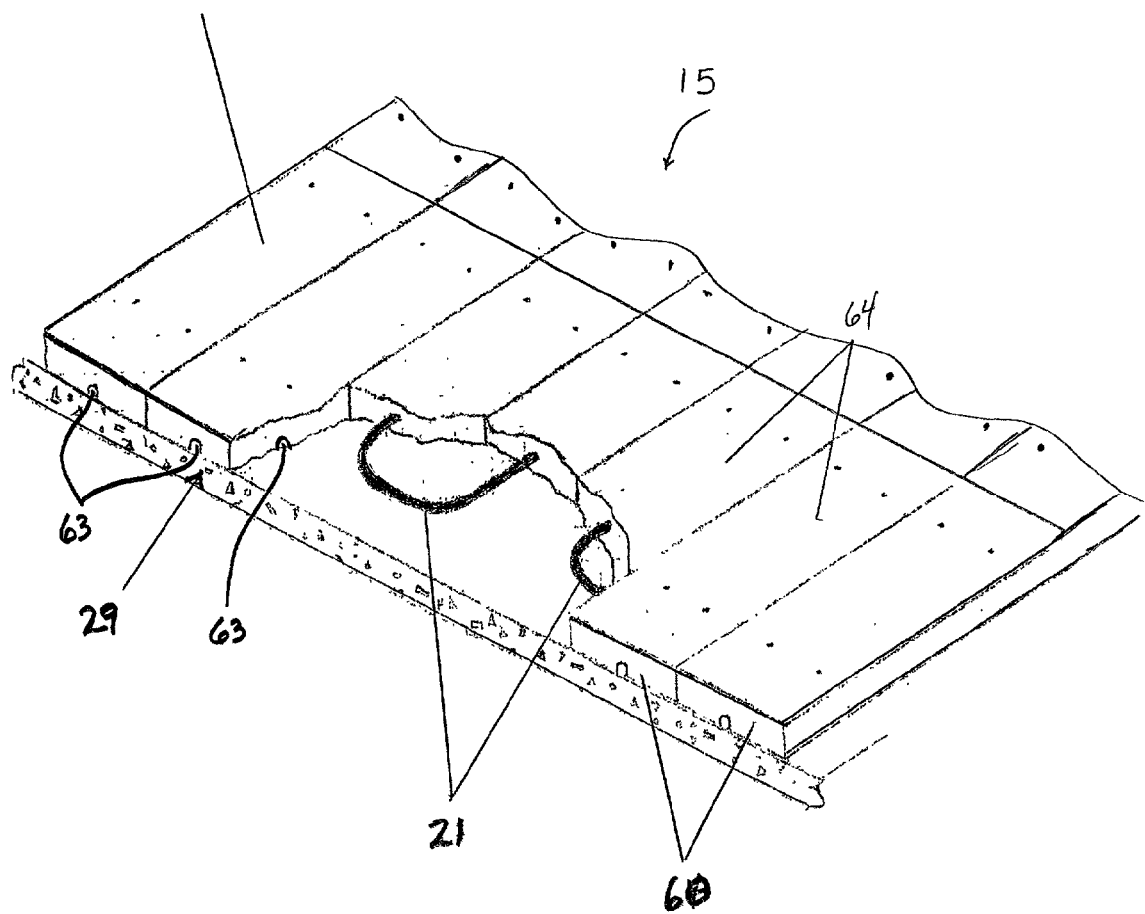
FIG. 21 is a fragmentary sectional perspective view of an alternate embodiment of the modular radiant heat panel system shown in FIG. 2.
Figure 25:
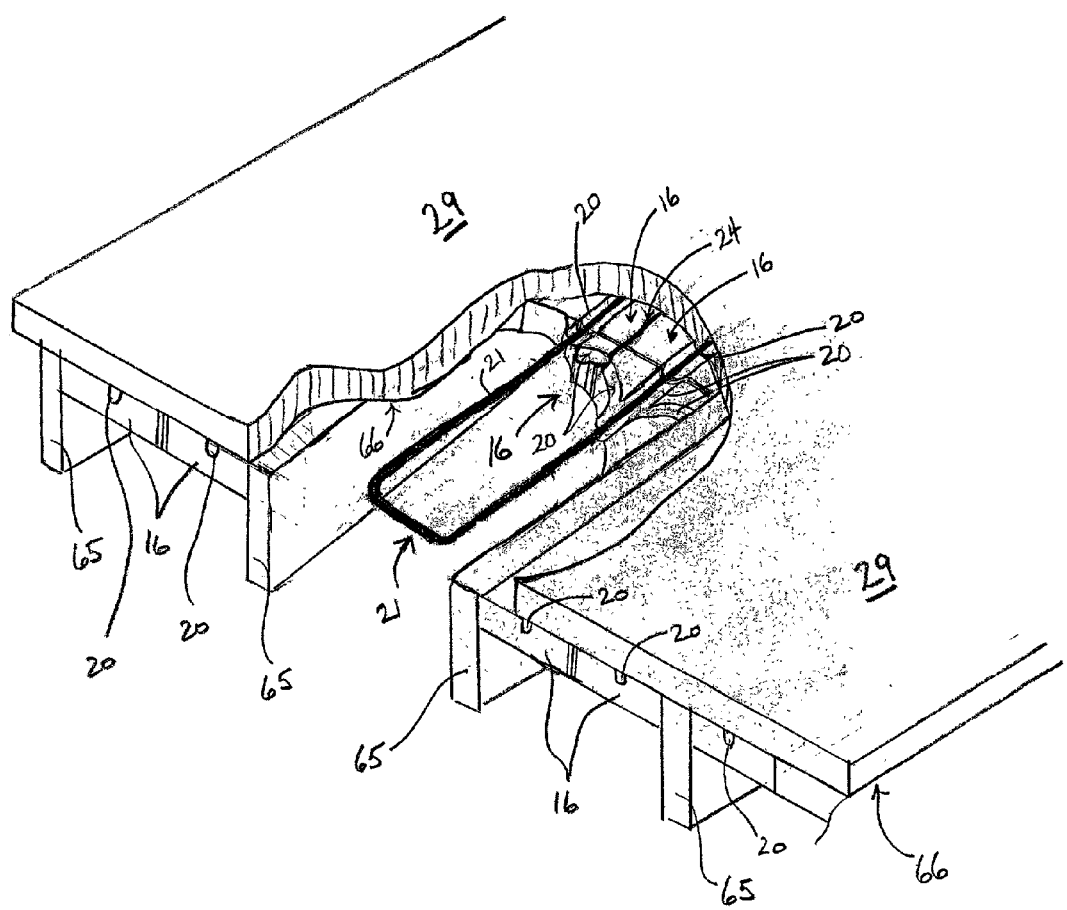
FIG. 25 is a fragmentary sectional perspective view of an alternate embodiment of the modular radiant heat panel system shown in FIG. 2.
Figure 1:
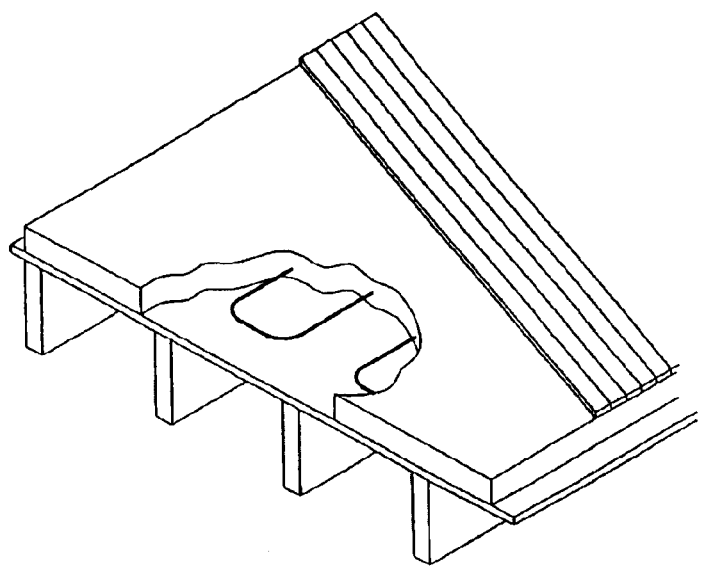
FIG. 1 is a fragmentary sectional perspective view of a radiant heat system known in the prior art.
Figure 2:
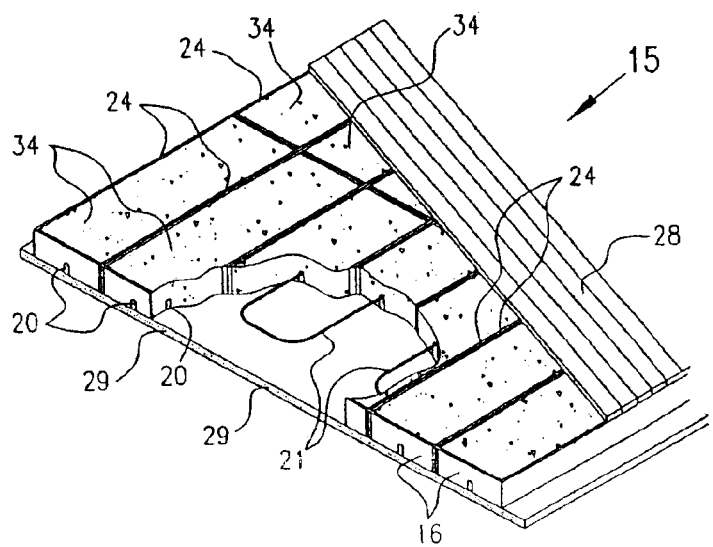
Figure 3:
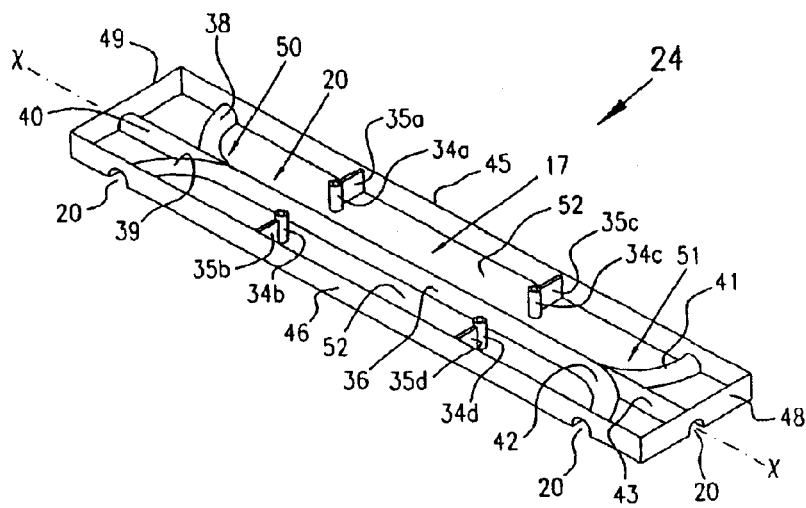

The area in which the radiant heat system is being installed is provided with an under-layer 29. As shown in FIG. 25, under-layer 29 may be a plywood subfloor. In other situations, as shown in FIGS. 2 and 21, it may be a concrete subfloor. Under-layer 29 is leveled, with any imperfections in the subfloor filled with an epoxy or other appropriate filler, and swept clean.

Figure 19:
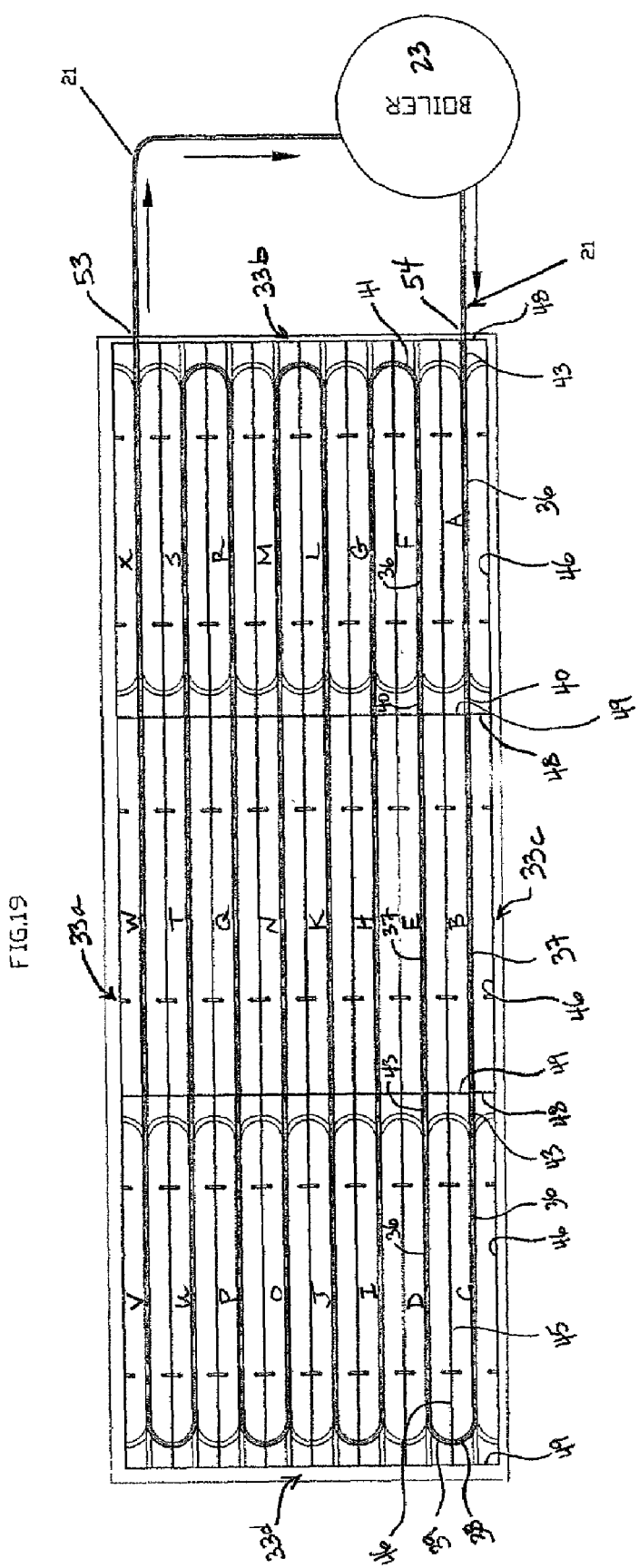
FIG. 19 is a schematic of the conduit routing shown in FIG. 18 in combination with a modular radiant heat panel arrangement.

The length of conduit 21 needed for given area 44 is determined. Based on the area, dimensions, and anticipated conduit routing, the appropriate number and types of panels are transported to the installation site. The number of panels required is based on the square footage of the subject area and the dimensions of the panels to be used. The types of panels used will depend on the channel configurations which are most appropriate for the predetermined routing of conduit 21. Also, the dimensions of channel 20 must be appropriate for the size and dimensions of conduit 21 being used. As shown in FIG. 19, different types of panels and channel configurations may be used depending on the desired routing of the conduit through the subject area.

Because of the small size and modular nature of the panels, they can be transported fairly easily and in manageable numbers, as circumstances such as the location of the installation site dictate. For example, if the system is being installed on the remote upper floors of a building, the panels can be carried to the site in smaller quantities, depending on the load capabilities of the transporter. This allows for the installation of the system in remote areas where it would otherwise be too cost prohibitive to install radiant heat.

Figure 23:
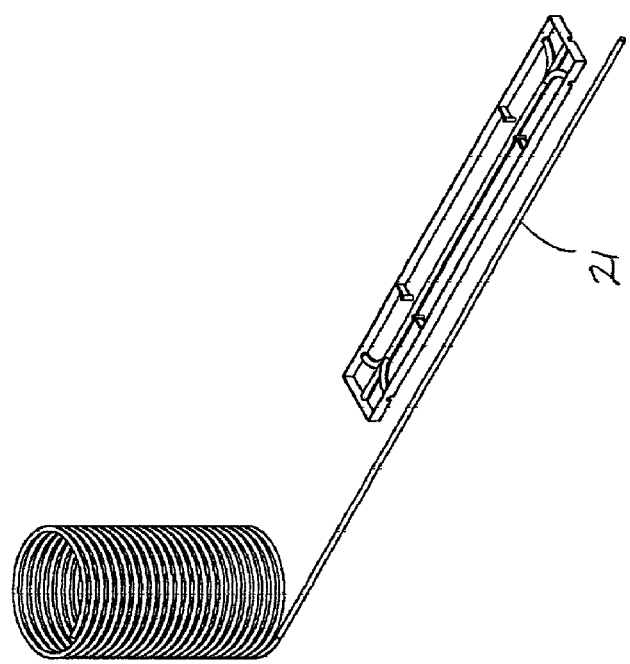
FIG. 23 is a schematic of the positioning of conduit and panels.
Figure 24:
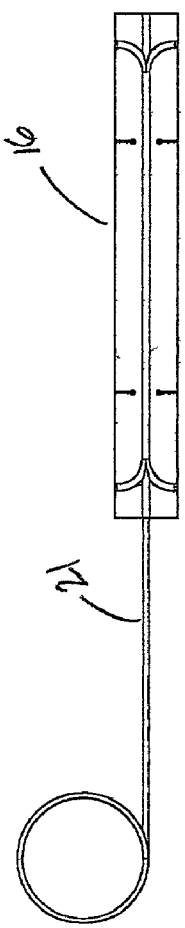
FIG. 24 is a top plan view of the schematic shown in FIG. 23.

The entrance 54 and exit 53 for the conduit tubing is determined and conduit 21 is passed through entrance 54. Two alternatives are available with respect to placing the panels and conduit in place. One alternative is to unroll conduit 21 in stages and to place conduit 21 and panels 16 in place as conduit 21 is unrolled from a spool. A schematic of this type of approach is shown in FIGS. 23 and 24. In this approach, conduit 21 is held in place as it is unrolled by the positioning of panels 16 over conduit 21 and the subsequent attachment of panel 16 to under-layer 29 with conduit 21 in the appropriate channel 20 of panel 16. Thus, panels 16 and conduit 21 are placed on under-layer 29 such that conduit 21 bends through conduit channel 20 in the routing configuration required for that portion of the subject area 44.

Alternatively, the full length of conduit 21 may be unrolled in a serpentine pattern on under-layer 29, extending from inlet 54 to outlet 53, before panels 16 are positioned and conduit 21 and panels 16 aligned such that conduit 21 extends through appropriate conduit channels 20.

Figure 20:
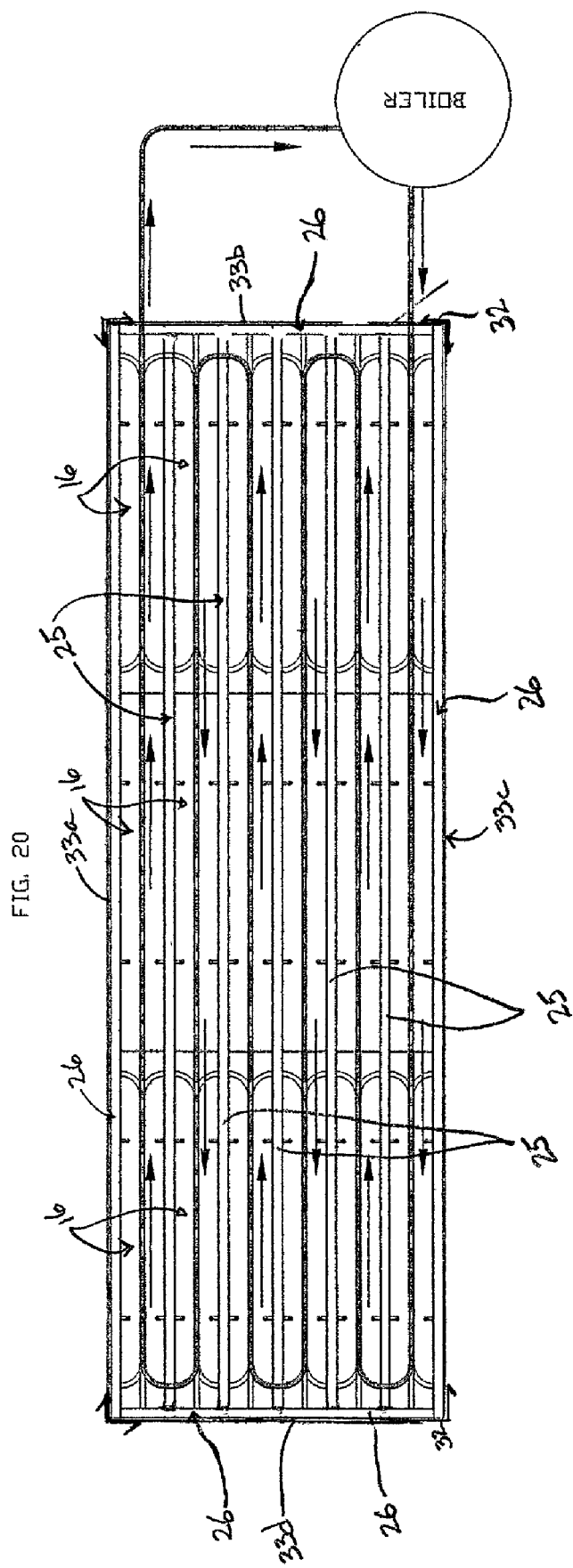
FIG. 20 is a schematic of the conduit routing shown in FIG. 17 in combination with an alternate modular radiant heat panel arrangement, which includes attachment and edge spacers.
Figure 18:
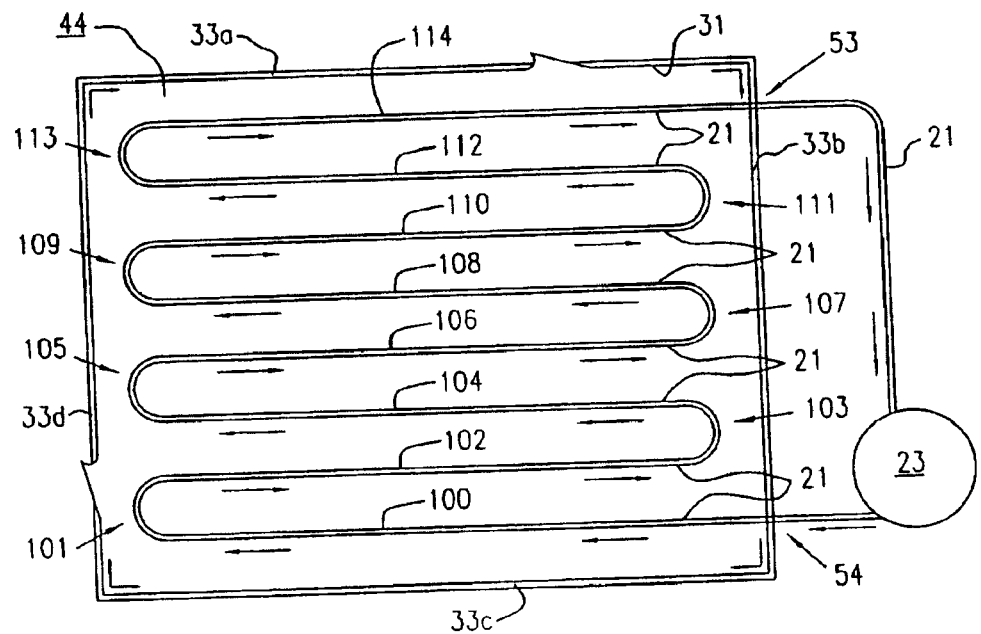
FIG. 18 is a schematic of conduit routing for a given area.
Figure 19:
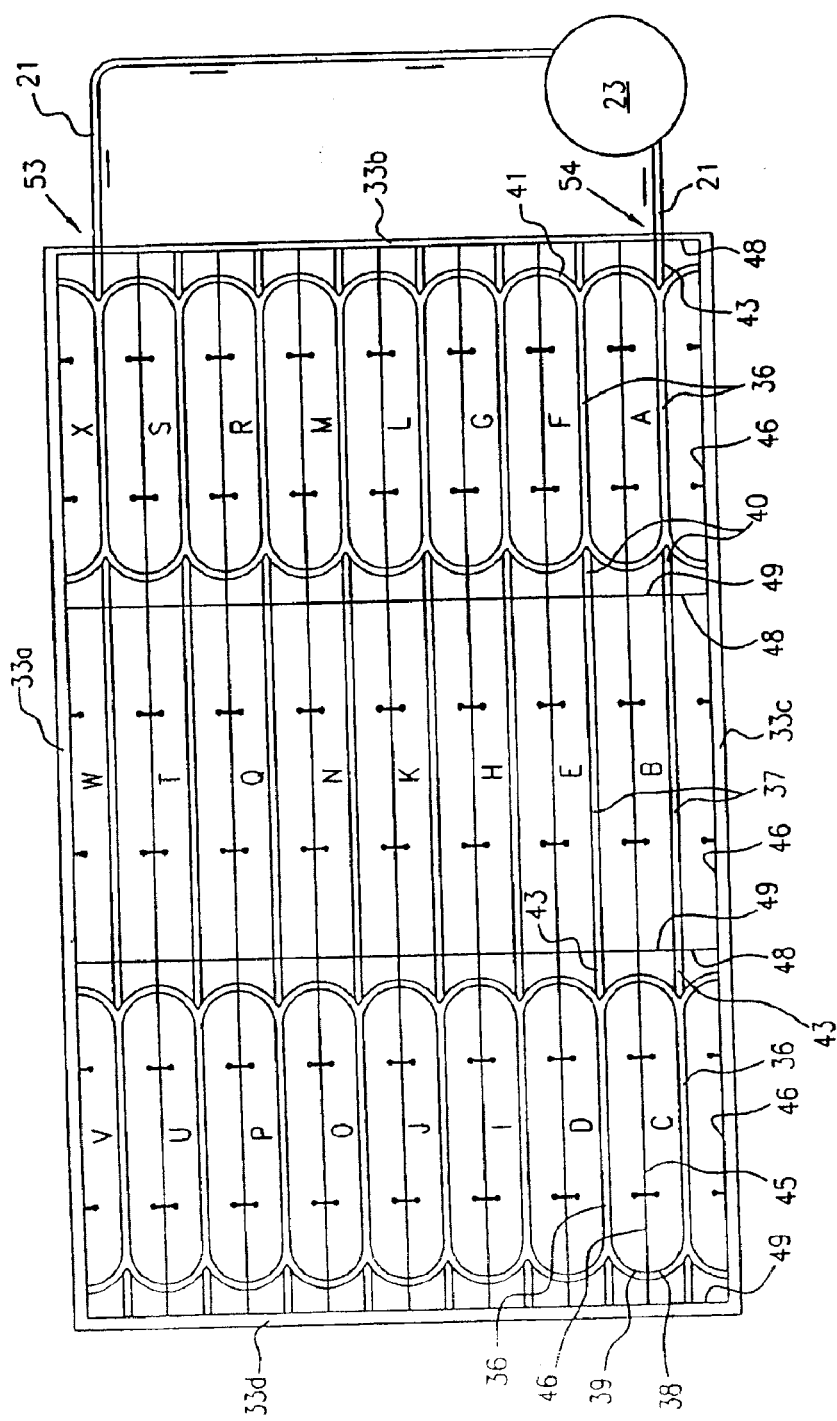
Figure 20:
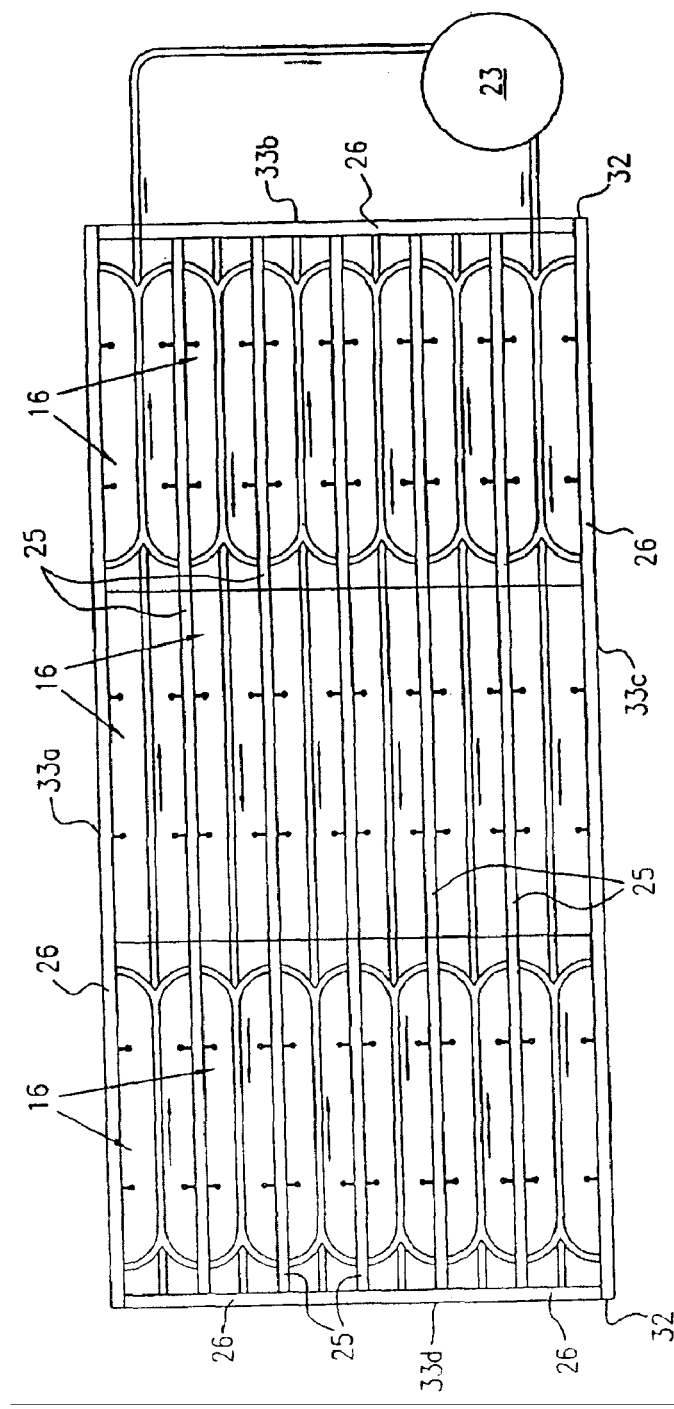
Figure 21:
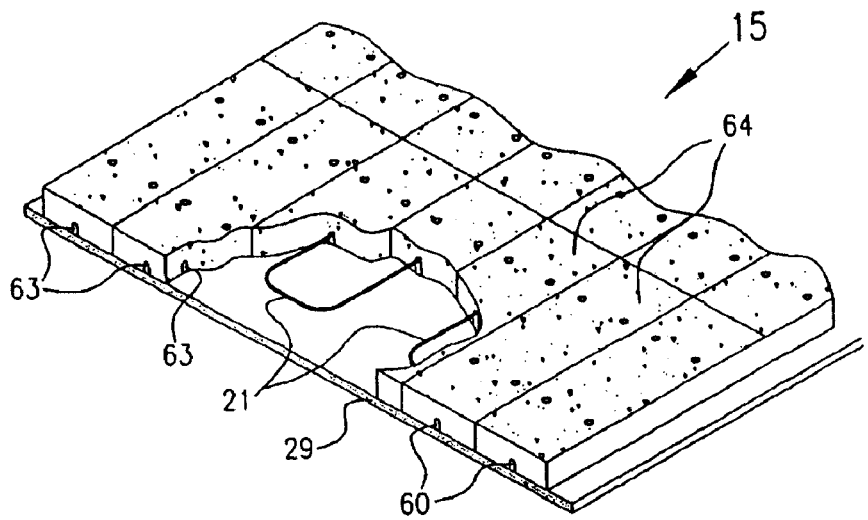
Figure 22:
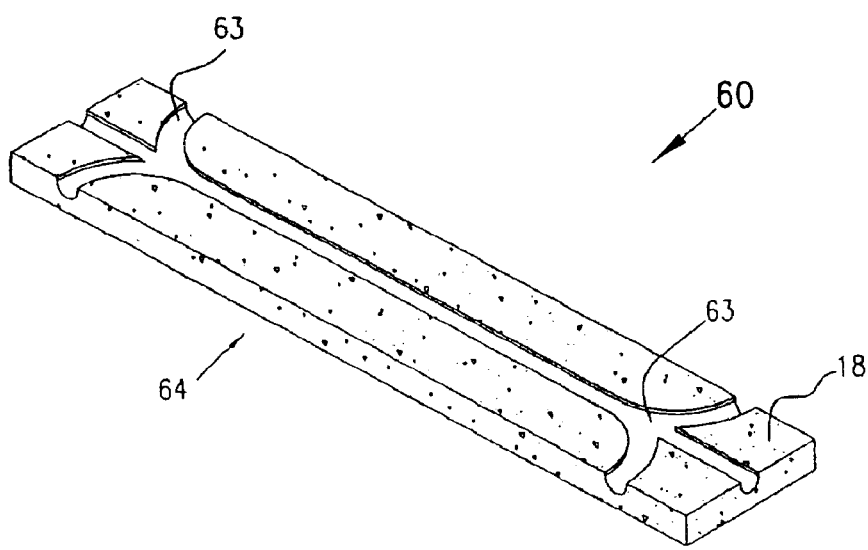
Figure 23:
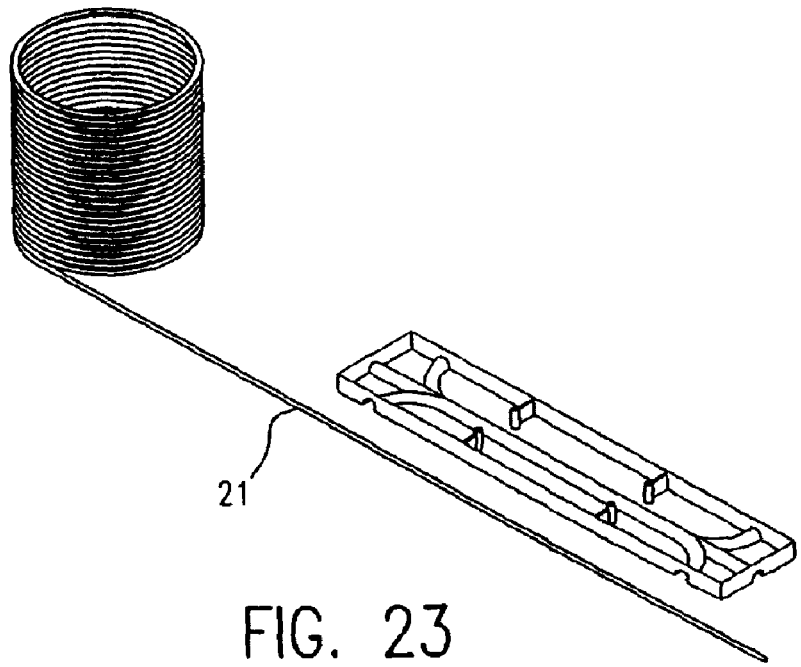
Figure 24:
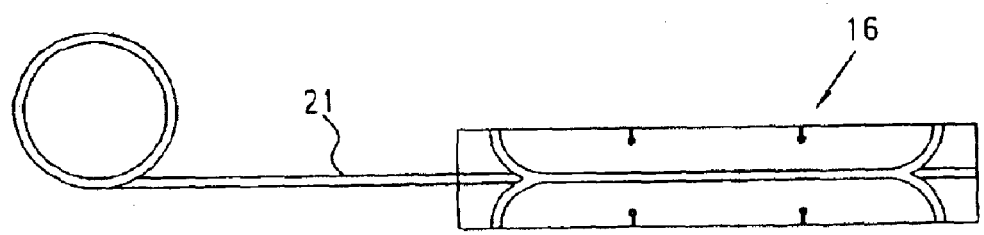
Figure 25:
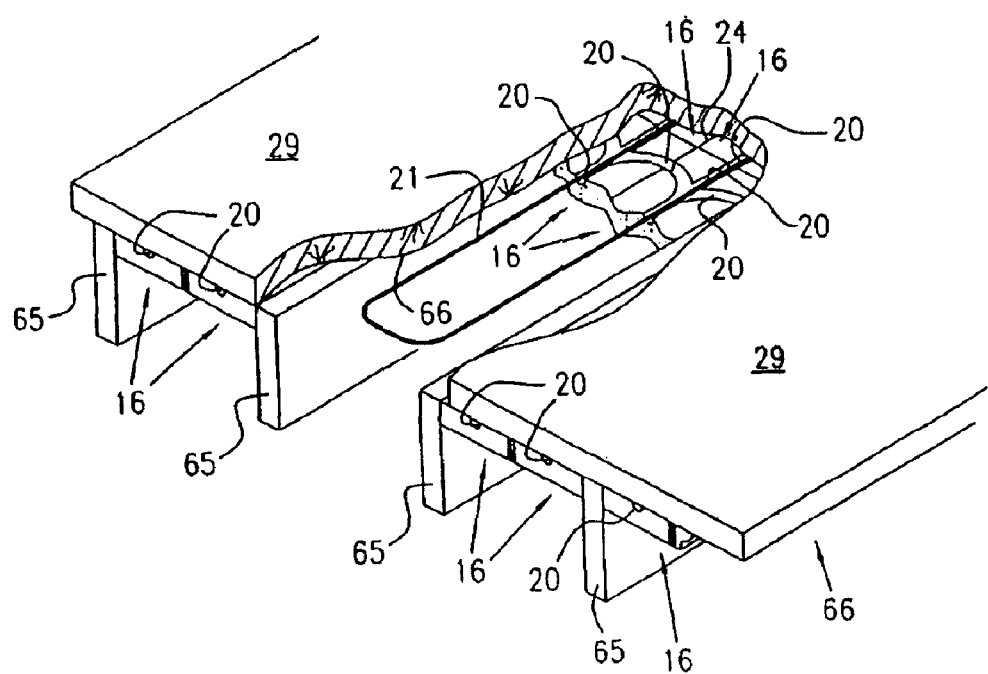
Figure 1:
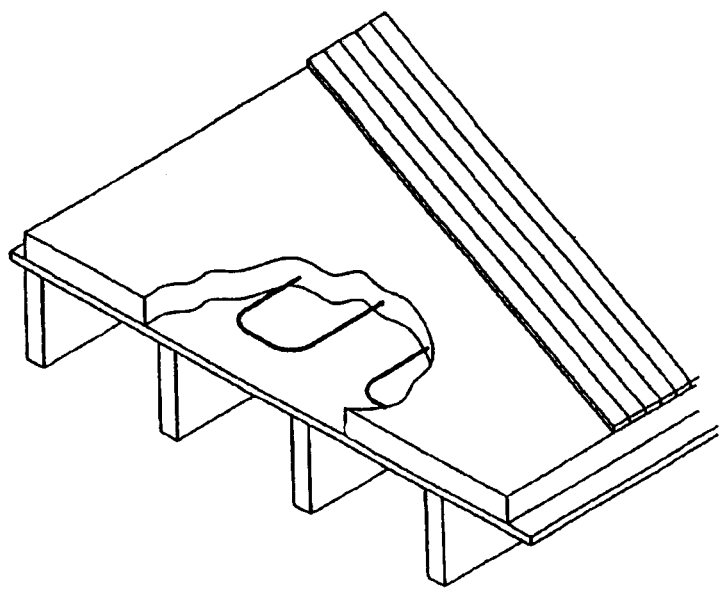
Figure 2:
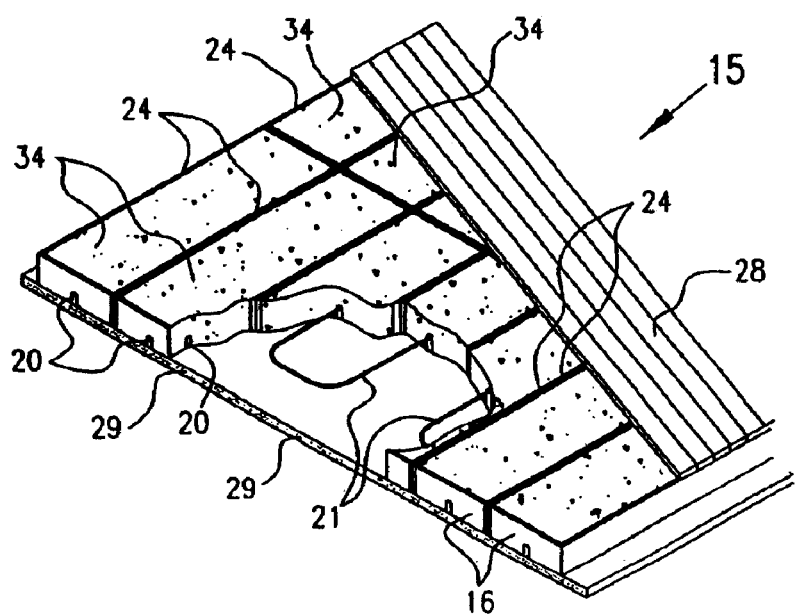
Figure 3:
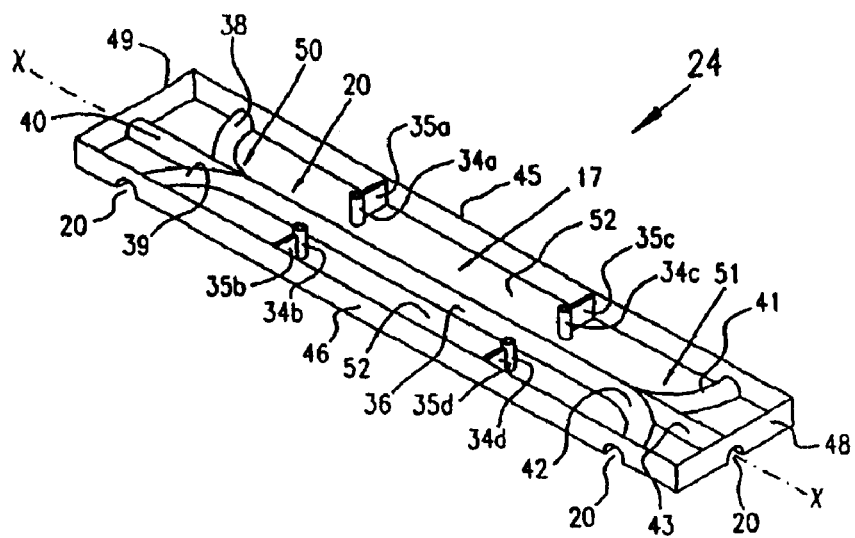
Figure 4:
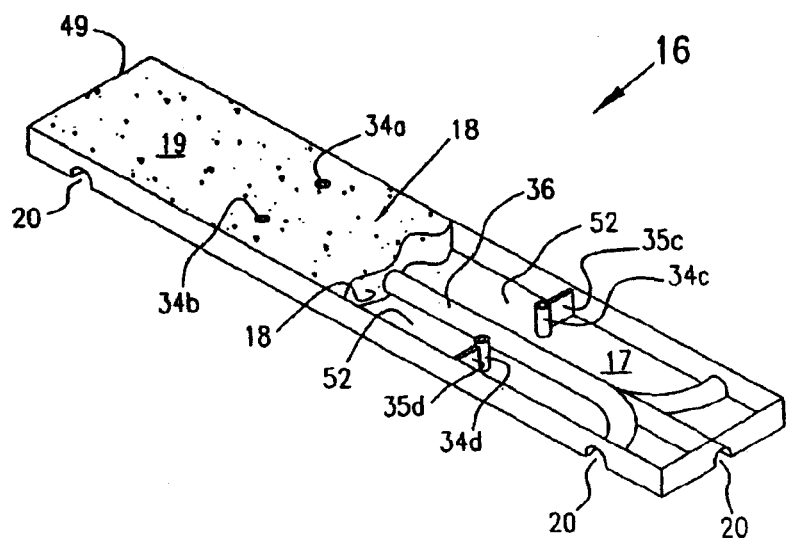
Figure 5:
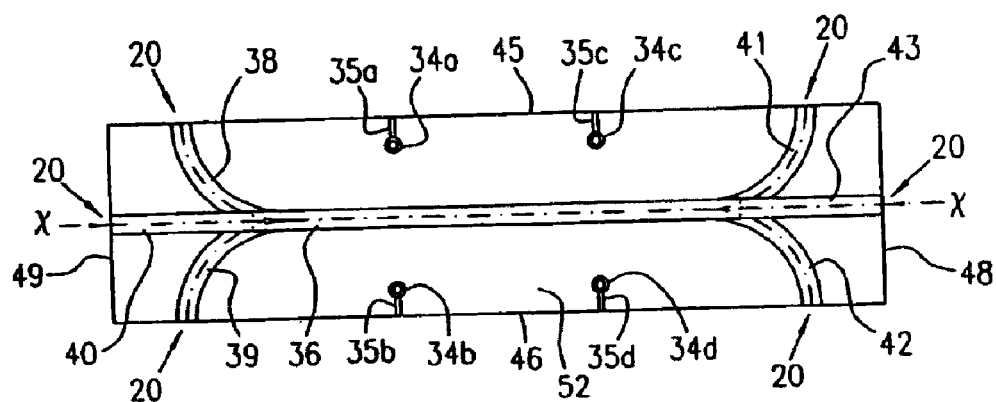
Figure 6:
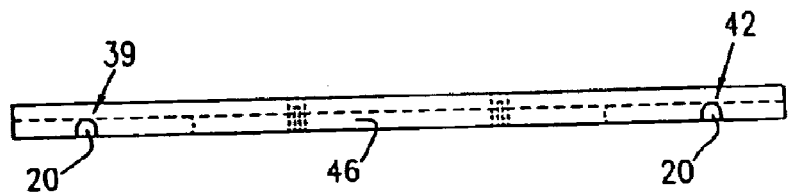
Figure 7:
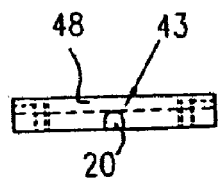
Figure 8:
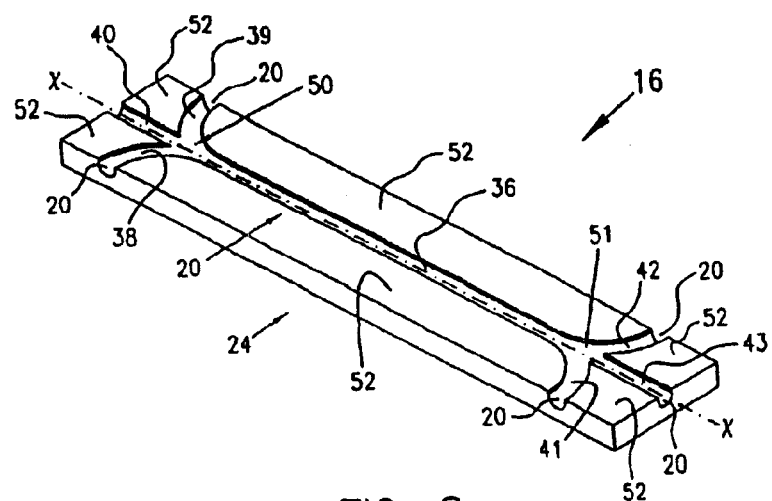
Figure 9:
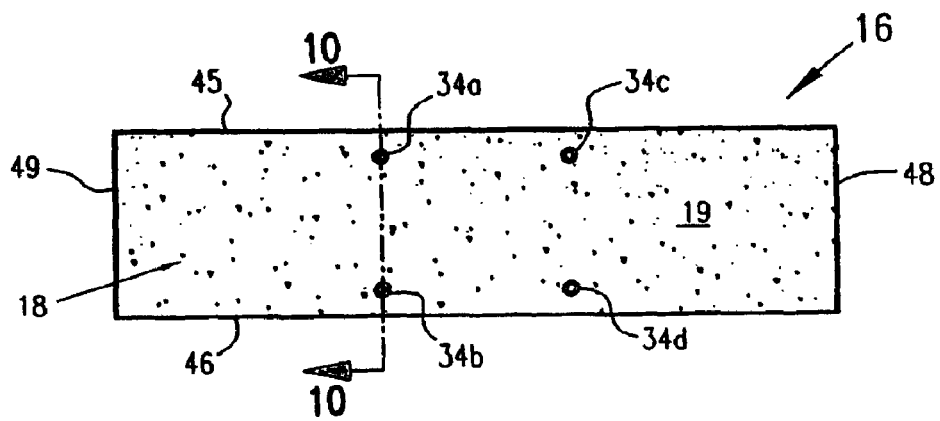
Figure 10:
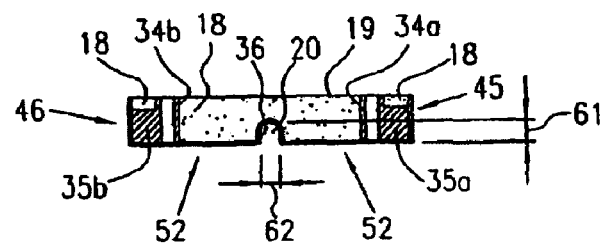
Figure 11:
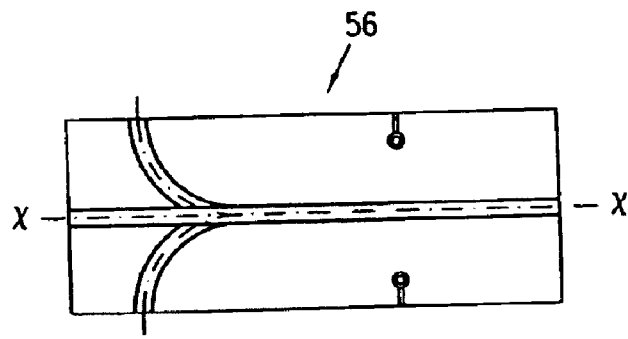
Figure 12:
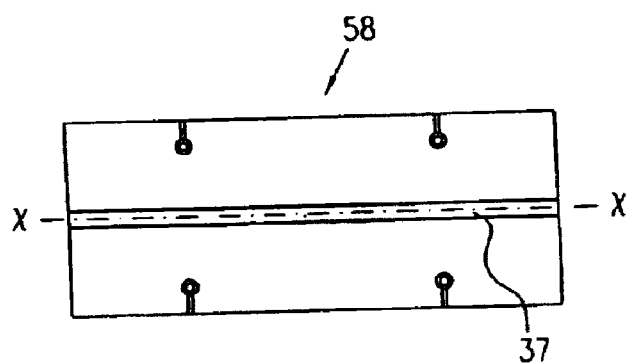
Figure 13:
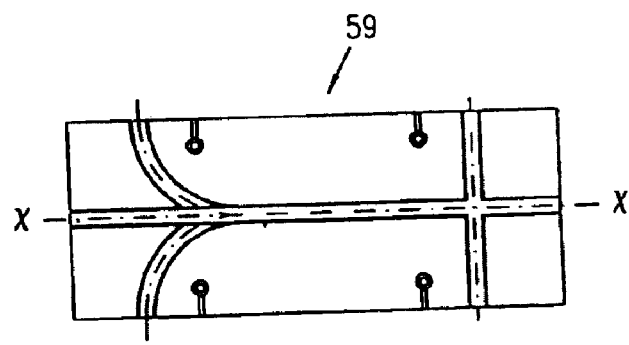
Figure 14:
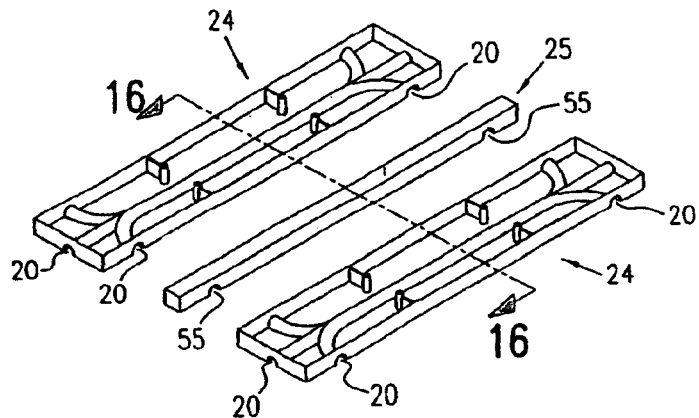
Figure 15:
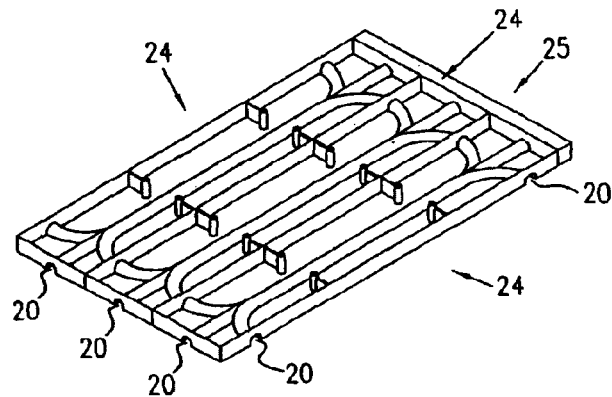
Figure 16:
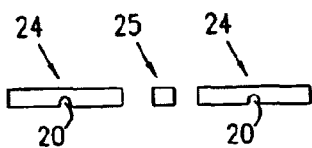
Figure 17:
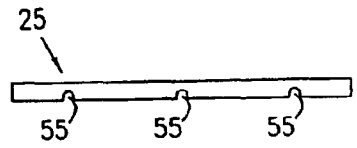
Figure 18:
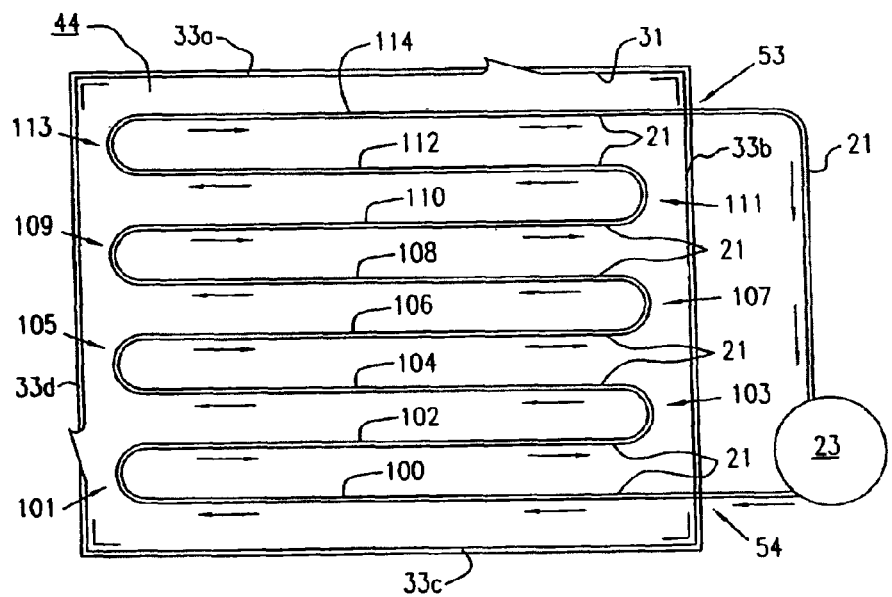
Figure 19:
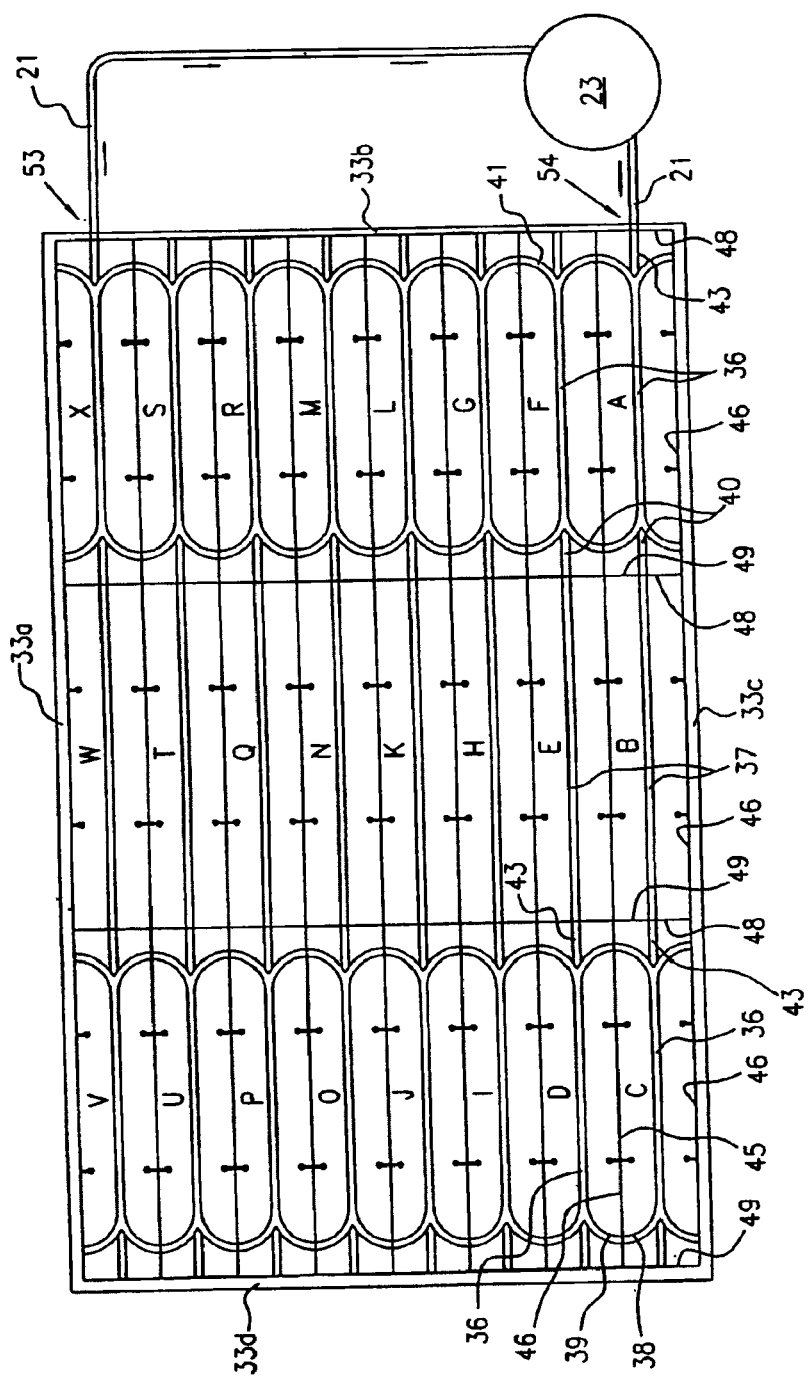
Figure 20:
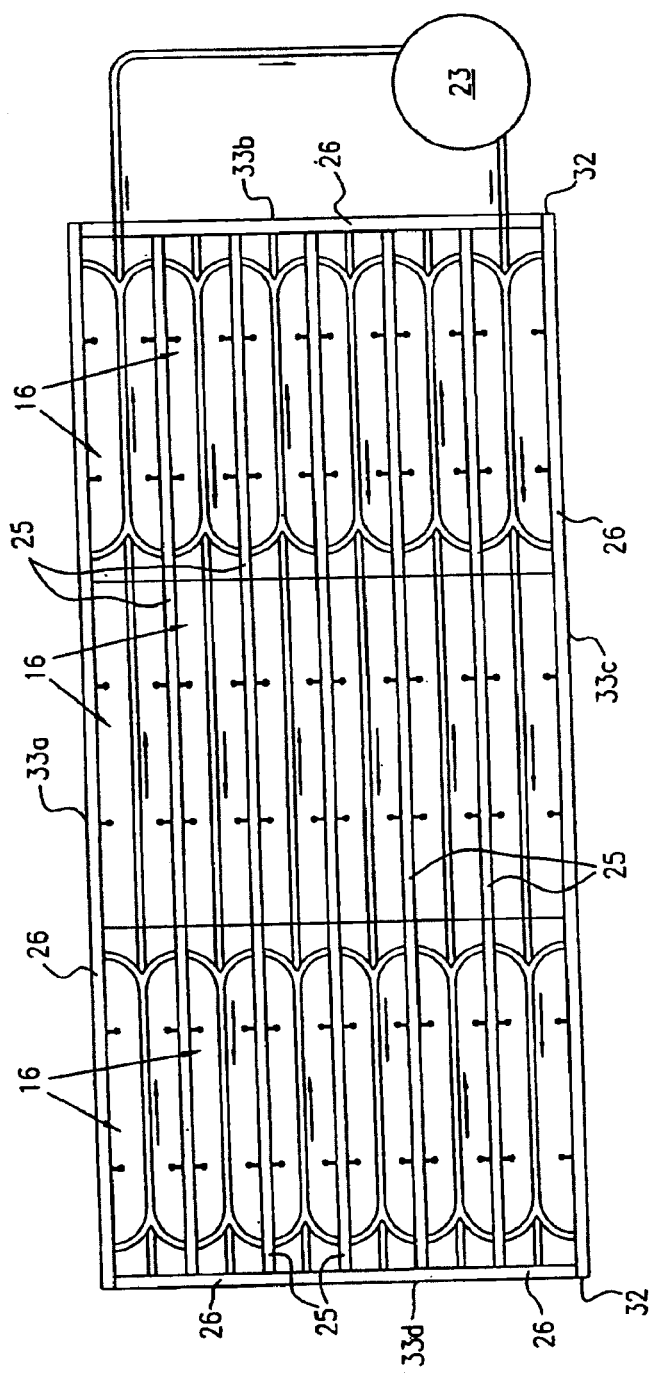
Figure 21:
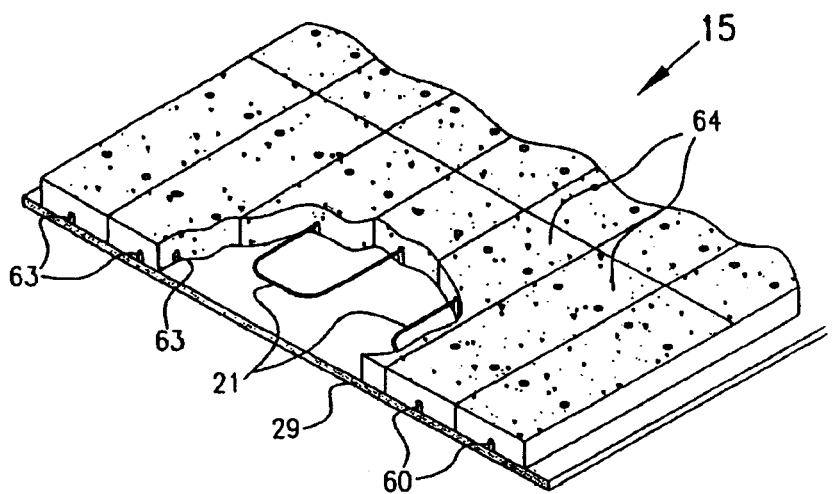
Figure 22:
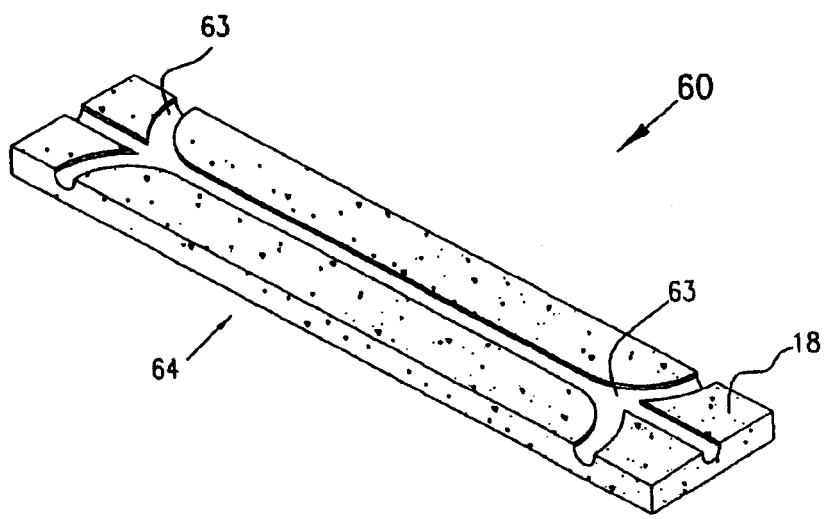
Figure 23:
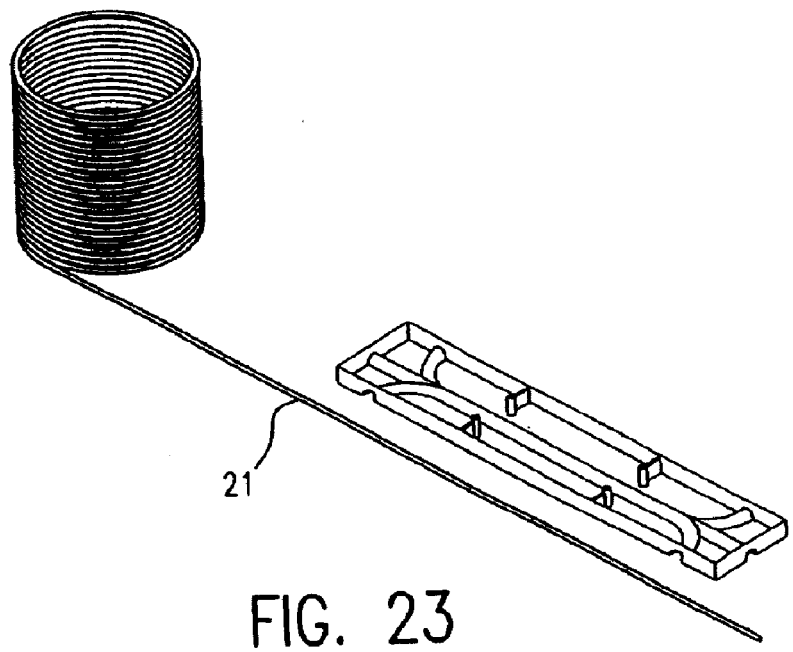
Figure 24:
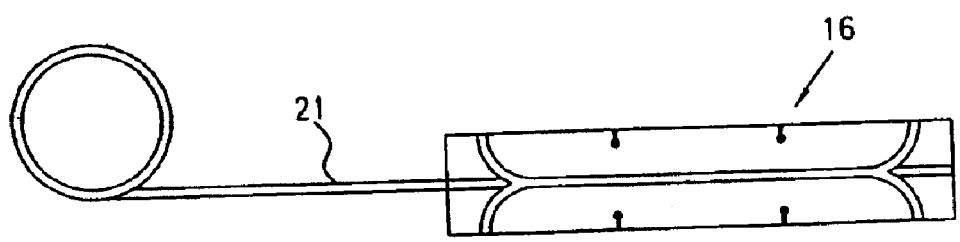
Figure 25:
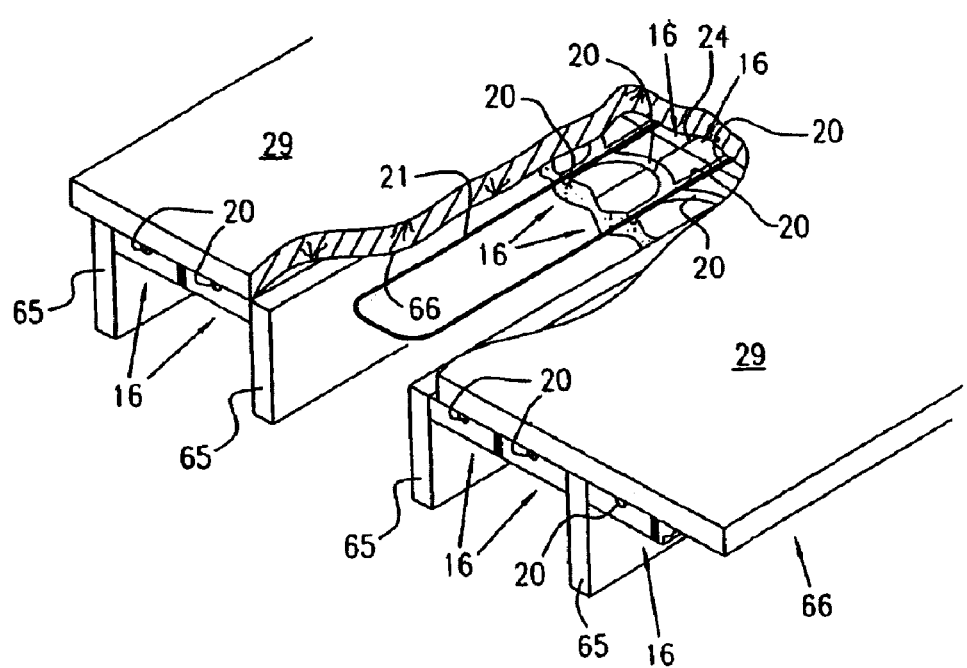

Whether conduit 21 is unrolled in short lengths just ahead of the placement and alignment of panels 16 or is unrolled in its entirety over the subject area, FIGS. 18–20 show conduit 21 in a final routing pattern for a subject area 44. As shown, conduit 21 is configured in a series of straight parallel sections 100, 102, 104, 106, 108, 110, 112, and 114, which are separated by semi-circular sections 101, 103, 105, 107, 109, 111 and 113. In FIGS. 18–20, the system is installed in a rectangular room having four walls 33a–33d and a perimeter 31 The walls define the subject heating area 44.

In FIG. 19 panels 16 are placed adjacent each other such that conduit channels 20 allow for the desired routing pattern of conduit 21. Thus, as shown in FIG. 19, the right side-wall 48 of bottom right panel A is positioned against wall 33b such that conduit 21 extends from inlet 54 and is held in place by troughs 43, 36 and 40. Next, the right side-wall 48 of bottom middle panel B is positioned against the left side-wall 49 of panel A and panel B and conduit 21 are aligned so that conduit 21 extends straight through trough 37 of panel B. The right side-wall 48 of bottom left panel C is positioned against the left side-wall 49 of panel B and panel B and conduit 21 are aligned so that conduit 21 extends straight through troughs 43 and 36 before bending right at junction 50 through trough 38 of panel C, thereby completing the first ninety degrees of semi-circular bend 101. The left side-wall of 49 of panel C is positioned against wall 33d and the front side-walls 46 of panels A, B and C are positioned against wall 33c. As can be seen, not all the troughs of channel 20 in panels A and C are used to hold conduit 21.

The front side-wall 46 of second from the bottom left side panel D is then positioned against the rear side-wall 45 of panel C and the left side-wall 49 of panel D is positioned against wall 33d and panel D and conduit 21 are aligned so that conduit 21 enters and bends through trough 39 of panel D and extends straight through troughs 36 and 43 of panel D, thereby completing the second ninety degrees of semi-circular bend 101. The left side-wall 49 of panel E is then positioned against the right side-wall 48 of panel D and the front side-wall 46 of panel E is positioned against the rear side-wall 45 of panel B and panel E and conduit 21 are aligned so that conduit 21 extends straight through trough 37 of panel E. The left side-wall 49 of panel F is positioned against the right side-wall 48 of panel E and the front side-wall 46 of panel F is positioned against the rear side-wall 45 of panel A and panel F and conduit 21 are aligned so that conduit 21 extends straight through troughs 40 and 36 before bending left at junction 51 through trough 41, thereby completing the first ninety degrees of semi-circular bend 103. The right side-wall 48 of panel F is positioned against wall 33b.

This pattern is followed until area 44 is covered with panels 16. In this manner, panels 16 hold conduit 21 in place as it extends from inlet 54 through sections 100–114 to outlet 53. Thus, panels 16 are placed to enclose conduit 21 in the appropriate channel configurations of panels 16 given the conduit routing pattern desired.

As shown in FIG. 19, alternately configured panel 58 may be used in panel locations B, E, H, K, N, Q, T or W. Alternately configured panel 56 may be used in panel locations C, D, I, J, O, P, U or V. As the panels are positioned, they are attached by screws to under-layer 29. The fasteners are screwed down through the guide-holes of fixture towers 34a–34d of each panel.

Figure 14:
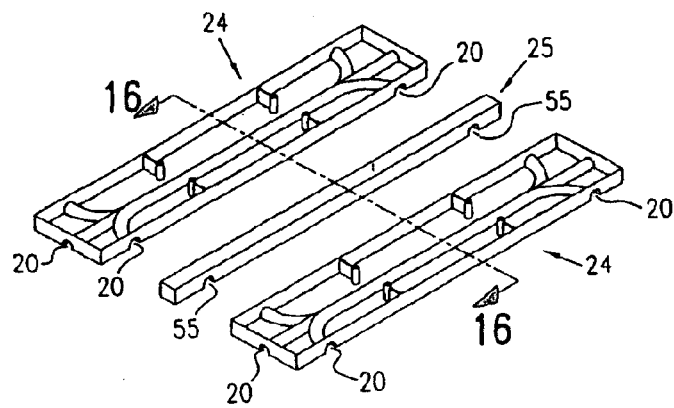
FIG. 14 is a perspective view of a tray and spacer combination.
Figure 15:
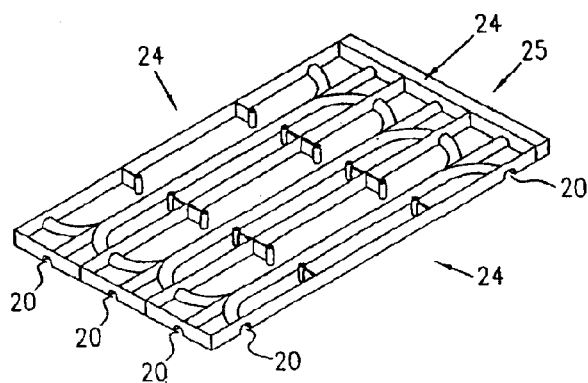
FIG. 15 is a perspective view of an alternate tray and spacer combination.
Figure 16:
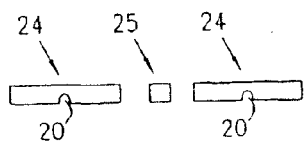
FIG. 16 is a vertical cross-sectional view of the tray and spacer combination shown in FIG. 14, taken generally on line 16—16 of FIG. 14.
Figure 17:
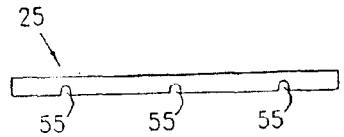
FIG. 17 is a right side elevation of the combination shown in FIG. 15.

FIG. 20 depicts an alternate pattern for positioning the panels in area 44. This embodiment uses a combination of panels together with attachment spacers 25 and edge spacers 26. As shown in FIG. 14, an attachment spacer having properly aligned channels 55 may be positioned between two rows of panels 16.

In FIG. 20, four edge spacers 26 are positioned between the inner perimeter 32 of walls 34a–34d and the outer perimeter 31 of panels 16 and attachment spacers 25. In addition, five attachment spacers 25 are positioned between rows of panels 16. Attachment spacers 25 have at least one channel 55 aligned to allow conduit 21 to pass through it where conduit 21 passes from one row of panels to the next. In this embodiment, edge spacers 26 and attachment spacers 25 are made of wood and are attached to under-layer 29 by mechanical fasteners such as screws. This allows for an over-layer 28 to be fastened at periodic intervals to attachment spacers 25 and edge spacers 26, thereby securing over-layer 28 to under-layer 29 without damaging the integrity of thermal mass 18.

As not all areas in which the modular radiant heat panel system might be employed are perfectly rectangular, it is contemplated that alternate routing of conduit may be necessary, in which case a different configuration of panels, edge spacers, or attachment spacers can be employed. Attachment spacers should be positioned intermittently to allow the attachment of over-layer 28 to under-layer 29. In addition, edge spacers 26 may be used not only to attach the outer perimeter edge of over-layer 28 to under-layer 29, but also to fill any irregular spaces between panels 16 and the vertical walls or other structure in the subject area. By using wood or other easily cut or shaped material, nonstandard spaces or irregular spaces may be easily filled.

Alternatively, a panel having no conduit channels but of the same substance as thermal mass 18 may be cut to fit irregular spaces between panels 16 and any vertical walls or other structure in the subject area. Thus, the outer edges of a room where the panels do not fit perfectly against the walls of the room may be filled by cutting such a panel to the dimensions and shape needed to fill such space. As a further alternative, cementitious non-shrink grout may be used to fill such irregularly-dimensioned spaces.

Once the tubing has been positioned in channels 20 of panels 16, conduit 21 is attached to a conventional zone regulator, which allows for independent control of the temperature in different zones of a structure The regulator is then connected to a conventional boiler 23, which heats the fluid running through conduit 21. In the preferred embodiment, water is used as the conducting fluid. However, other fluid such as an antifreeze mix or glycol may be employed. The fluid is heated by boiler 23 and pumped through the circuit of conduit 21. As it flows through conduit 21 where conduit 21 passes or extends through channels 20, heat in the circulated fluid is conducted to thermal mass 18 of panels 16. The heat is stored in and radiates from thermal mass 18.

FIG. 21 shows an alternate embodiment to the modular radiant heat panel system shown in FIG. 2. The system shown in this alternate embodiment broadly includes an under-layer 29, multiple radiant heat transfer panels 60, and conduit 21 winding through certain of conduit channels 63 in panels 60. Unlike the embodiment shown in FIG. 2, this embodiment does not include an over-layer. Instead, outer surface 64 of panels 60 operates as the finished floor surface. Panels 60 are formed with an outer surface 64 which is appropriate for a finished floor. This finished outer surface is formed by impregnating surface 64 with tile or another suitable finished surfacing material.

Figure 22:
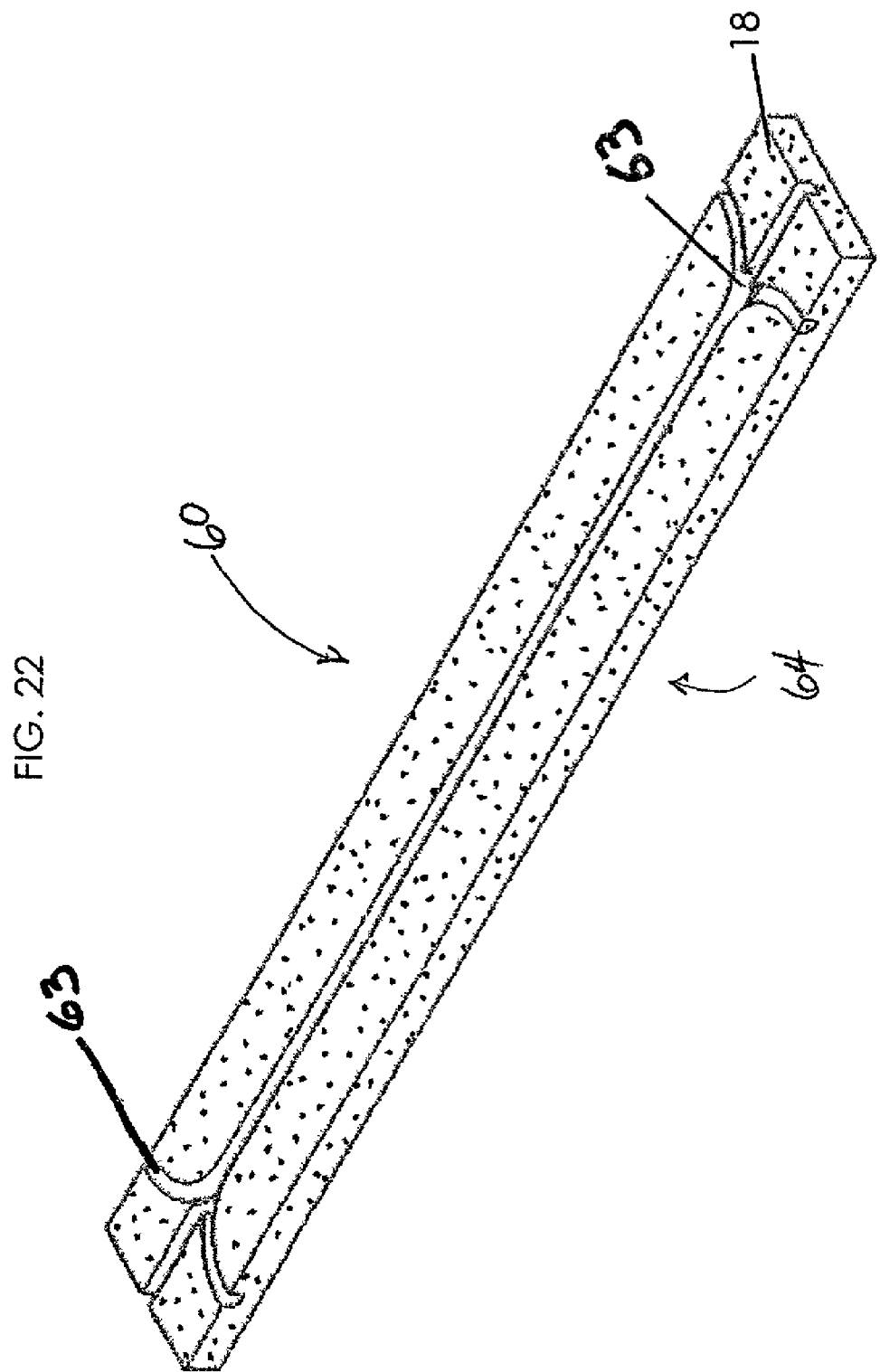
FIG. 22 is a bottom perspective view of the thermal panel shown in FIG. 21.

Also, in contrast to panels 16, panels 60 do not include a tray 24. As shown in FIG. 22, panels 60 have a thermal mass 18, an outer surface 64, and a conduit channel 63. The panel shown in FIG. 22 is formed by pouring thermal mass 18 into an appropriate mold, allowing thermal mass 18 to cure, and then removing thermal mass 18 from the mold to provide panel 60 with conduit channel 64. Much like panel 16, panel 60 may be molded to have a variety of different conduit channel configurations, examples of which are provided in FIGS. 11–13. By using panel 60, which does not include tray 24, the vertical sides of the panels may be positioned against each other or against spacers or walls without being separated by a thickness of plastic, which may be desired in certain applications. In this embodiment, conduit 21 contacts thermal mass 18 directly, rather than being in physical contact with channels 20 of tray 24. Heat in the circulated fluid in conduit 21 where conduit 21 passes or extends through channels 63 is conducted directly to thermal mass 18. The heat is stored in and radiates from panel 60 directly into the room, rather than through an over-layer 28.

A third embodiment is shown in FIG. 25. This embodiment is especially suited to situations in which radiant heat is being installed with an existing finished floor. In this application, panels 16 are placed upside down against the underside of the existing flooring system. Typically, panels 16 are designed to fit between the floor joists 65 of the subfloor or under-layer 29. Thus, panels 16 are oriented, as in FIG. 8, with the open portion of the troughs of conduit channel 20 facing up. Conduit 21 is routed with parallel sections 100, 102, 104, 106, 108, 110, 112 and 114 running between and parallel to the floor joists 65, and with holes drilled at appropriate intervals in floor joists 65 for conduit 21 to pass through when making bends 101, 103, 105, 107, 109, 111 and 113. Thus, the floor joists 25 are oriented similar to attachment spacers 25 in FIG. 20 with respect to panels 16 and conduit 21.

Panels 16 are positioned with bottom member 52 in contact with the underside 66 of floor 29 and with conduit 21 aligned in the appropriate channels 20 of panels 16. The panels are attached by screwing fasteners up through the guide holes of fixture towers 34a–34d of each panel into the underside 66 of the existing floor 29. Panels 16 are in essence hung from the existing floor and the existing floor holds the panels in place. Depending on the spacing between floor joists and the panel dimensions, one, two (as shown in FIG. 25) or more rows of panels may be run between each set of floor joists. Panels 16 may be provided with alternate channel configurations depending on the conduit routing required. In this embodiment, heat in circulated fluid is conducted to and stored in thermal mass 18 of panels 16, and radiates therefrom.

As can be appreciated, alternate panel 60 may be employed in this third embodiment. Also, as a further alternative, panels 16 may be positioned with outer surface 19 against or in contact with the underside 66 of floor 29 and with conduit 21 separated from the underside 66 of floor 29 by thermal mass 18. In this orientation, conduit 21 may be held in channels 20 by appropriate fasteners to provide efficient conductivity. Panels 16 are attached to the underside 66 of floor 29 by fasteners screwed through fixture towers 34a–34d in the opposite direction to the direction shown and described in FIG. 2.

The present invention contemplates that many changes and modifications may be made. Therefore, while the presently-preferred form of the modular radiant heat panel system has been shown and described, and several modifications and alternatives shown or discussed, persons skilled in this art will readily appreciate that various additional changes and modifications may be made without departing from the spirit of the invention, as defined and differentiated by the following claims.

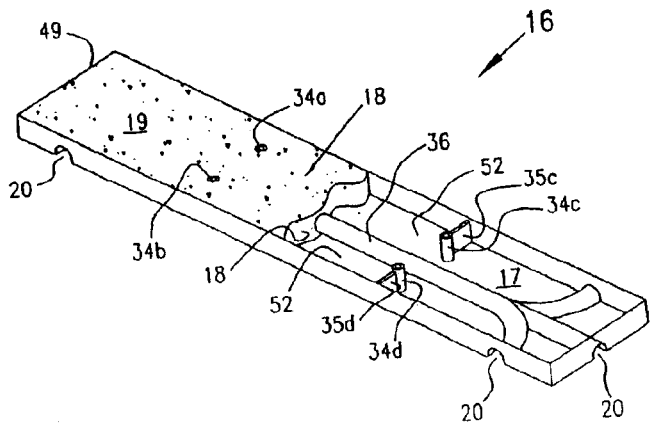

What is claimed is:

1. A radiant heat transfer panel adapted to communicate with a fluid conduit comprising:
    a formed tray having a first side and an opposed second side;
    said tray comprising a fixture tower and defining a containment space and a conduit channel;
    said fixture tower comprising a throughbore extending between said first side and said second side;
    said space containing a thermal mass;
    said channel, containment space and thermal mass configured and arranged to permit heat transfer between said channel and said thermal mass.

2. The radiant heat transfer panel set forth in claim 1, wherein said tray comprises a side gusset.

3. The radiant heat transfer panel set forth in claim 1, wherein said conduit channel is a U-shaped trough or is cylindrical.

4. The radiant heat transfer panel set forth in claim 1, wherein said conduit channel comprises a linear section and an arcuate section.

5. The radiant heat transfer panel set forth in claim 1, wherein said thermal mass comprises a composition selected from a group consisting of cement, mortar, ceramic, concrete and stone.

6. The radiant heat transfer panel set forth in claim 1, wherein said thermal mass has an outer surface and said outer surface is a finished flooring surface.

7. The radiant heat transfer panel set forth in claim 1, wherein said tray is a single unitary piece.

8. The radiant heat transfer panel set forth in claim 1, wherein said containment space extends into said tray from said first side and said conduit channel extends into said tray from said second side.

* * * * *

UNITED STATES PATENT AND TRADEMARK OFFICE
CERTIFICATE OF CORRECTION

PATENT NO. : 7,013,609 B2
APPLICATION NO. : 10/087318
DATED : March 21, 2006
INVENTOR(S) : Gary J. Hydock It is certified that error appears in the above-identified patent and that said Letters Patent is hereby corrected as shown below:

The title page, showing an illustrative figure, should be deleted and substitute the attached title page.

Delete drawing sheets consisting of figures 1-25, and substitute the attached drawing sheets consisting of figures 1-25.

Signed and Sealed this

Eleventh Day of July, 2006

JON W. DUDAS
*Director of the United States Patent and Trademark Office*

(12) United States Patent
Hydock

(10) Patent No.: US 7,013,609 B2
(45) Date of Patent: Mar. 21, 2006

(54) MODULAR RADIANT HEAT PANEL SYSTEM

(76) Inventor: Gary J. Hydock, 13199 Parker Rd., Holland, NY (US) 14080

( * ) Notice: Subject to any disclaimer, the term of this patent is extended or adjusted under 35 U.S.C. 154(b) by 306 days.

(21) Appl. No.: 10/087,318

(22) Filed: Mar. 1, 2002

(65) Prior Publication Data

US 2003/0163965 A1    Sep. 4, 2003

(51) Int. Cl.
*E04C 2/52* (2006.01)
(52) U.S. Cl. .................................. 52/220.1; 165/49
(58) Field of Classification Search ............. 52/406.2, 52/407.5, 414, 480, 607, 309.8, 403.1, 342, 52/220.1, 220.2, 220.3, 745.4, 684, 712; 219/213; 165/49, 48.2, 168, 169, 47
See application file for complete search history.

(56) References Cited

U.S. PATENT DOCUMENTS

| | | | | |
|---|---|---|---|---|
| 2,726,593 | A * | 12/1955 | Lahti | |
| 4,212,348 | A * | 7/1980 | Kobayashi | 165/49 |
| 4,338,995 | A * | 7/1982 | Shelley | 165/49 |
| 4,635,710 | A * | 1/1987 | Shelley | 165/49 |
| 4,766,951 | A * | 8/1988 | Bergh | 165/56 |
| 4,865,120 | A * | 9/1989 | Shiroki | 165/56 |
| 5,078,203 | A * | 1/1992 | Shiroki | 165/56 |
| 5,415,155 | A * | 5/1995 | Cohen et al. | 126/663 |
| 5,454,428 | A | 10/1995 | Pickard et al. | |
| 5,550,350 | A * | 8/1996 | Barnes | 219/213 |
| 5,598,682 | A | 2/1997 | Haughian | |
| 5,862,854 | A * | 1/1999 | Gary | 165/55 |
| 6,021,646 | A * | 2/2000 | Burley et al. | 62/235 |
| 6,283,382 | B1 * | 9/2001 | Fitzemeyer | 237/69 |

FOREIGN PATENT DOCUMENTS

JP    2003-336305    *    5/2002

* cited by examiner

*Primary Examiner*—Gwendolyn Baxter
(74) *Attorney, Agent, or Firm*—Phillips Lytle LLP

(57) ABSTRACT

The invention is directed to modular radiant heat panel system. In the preferred embodiment, the system comprises multiple radiant heat transfer panels (16), each of the panels having a thermal mass (18) and a conduit channel (20); a fluid conduit (21), the conduit communicating with an apparatus (23) for heating fluid (22) in the conduit; the multiple panels positioned adjacent each other such that the conduit extends through a series of the conduit channels; the panels, conduit and apparatus so configured and arranged to permit heat transfer from the fluid to the thermal mass of the panel, whereby heat radiates from the panel. The present invention also discloses a radiant heat transfer panel for engagement with a fluid conduit comprising: a formed tray (24); the tray defining a thermal volume (17) and a conduit channel; the volume containing a thermal mass; and the channel, volume and thermal mass configured and arranged to permit heat transfer between the conduit and the thermal mass. The invention also discloses a method for installing a modular radiant heat panel system comprising the steps of: providing an under-layer having a given area (44); providing multiple panels having a thermal mass and a conduit channel; providing conduit; position the conduit over or under the under-layer in a predetermined pattern; and positioning the panels on or under the under-layer such that the conduit extends through at least a portion of the conduit channel of the panels.

8 Claims, 16 Drawing Sheets

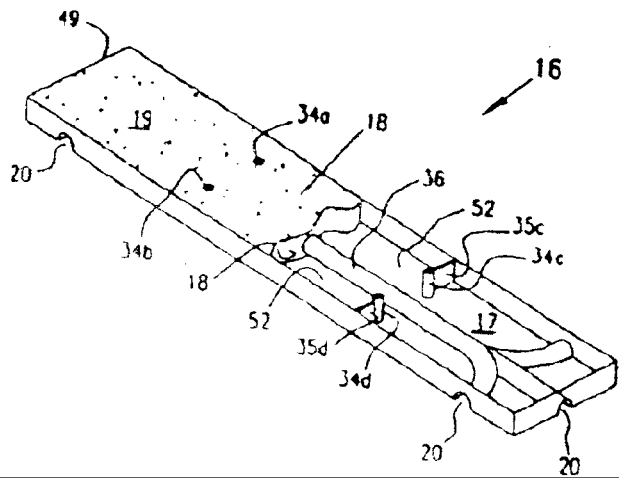

UNITED STATES PATENT AND TRADEMARK OFFICE
CERTIFICATE OF CORRECTION

| | | |
|---|---|---|
| PATENT NO. | : 7,013,609 B2 | Page 1 of 18 |
| APPLICATION NO. | : 10/087318 | |
| DATED | : March 21, 2006 | |
| INVENTOR(S) | : Gary J. Hydock | |

It is certified that error appears in the above-identified patent and that said Letters Patent is hereby corrected as shown below:

The title page, showing an illustrative figure, should be deleted and substitute the attached title page.

Delete drawing sheets consisting of figures 1-25, and substitute the attached drawing sheets consisting of figures 1-25.

This certificate supersedes Certificate of Correction issued July 11, 2006.

Signed and Sealed this

Twenty-fourth Day of October, 2006

JON W. DUDAS
*Director of the United States Patent and Trademark Office*

(12) United States Patent
Hydock

(10) Patent No.: US 7,013,609 B2
(45) Date of Patent: Mar. 21, 2006

(54) MODULAR RADIANT HEAT PANEL SYSTEM

(76) Inventor: Gary J. Hydock, 13199 Parker Rd., Holland, NY (US) 14080

( * ) Notice: Subject to any disclaimer, the term of this patent is extended or adjusted under 35 U.S.C. 154(b) by 306 days.

(21) Appl. No.: 10/087,318

(22) Filed: Mar. 1, 2002

(65) Prior Publication Data

US 2003/0163965 A1 Sep. 4, 2003

(51) Int. Cl.
*E04C 2/52* (2006.01)
(52) U.S. Cl. ..................................... 52/220.1; 165/49
(58) Field of Classification Search ............... 52/406.2, 52/407.5, 414, 480, 607, 309.8, 403.1, 342, 52/220.1, 220.2, 220.3, 745.4, 684, 712; 219/213; 165/49, 48.2, 168, 169, 47
See application file for complete search history.

(56) References Cited

U.S. PATENT DOCUMENTS

| | | | |
|---|---|---|---|
| 2,726,593 A * | 12/1955 | Lahti | |
| 4,212,348 A * | 7/1980 | Kobayashi | 165/49 |
| 4,338,995 A * | 7/1982 | Shelley | 165/49 |
| 4,635,710 A * | 1/1987 | Shelley | 165/49 |
| 4,766,951 A * | 8/1988 | Bergh | 165/56 |
| 4,865,120 A * | 9/1989 | Shiroki | 165/56 |
| 5,078,203 A * | 1/1992 | Shiroki | 165/56 |
| 5,415,155 A * | 5/1995 | Cohen et al. | 126/663 |
| 5,454,428 A | 10/1995 | Pickard et al. | |
| 5,550,350 A * | 8/1996 | Barnes | 219/213 |
| 5,598,682 A | 2/1997 | Haughian | |
| 5,862,854 A * | 1/1999 | Gary | 165/55 |
| 6,021,646 A * | 2/2000 | Burley et al. | 62/235 |
| 6,283,382 B1 * | 9/2001 | Fitzemeyer | 237/69 |

FOREIGN PATENT DOCUMENTS

JP 2003-336305 * 5/2002

* cited by examiner

*Primary Examiner*—Gwendolyn Baxter
(74) *Attorney, Agent, or Firm*—Phillips Lytle LLP

(57) ABSTRACT

The invention is directed to modular radiant heat panel system. In the preferred embodiment, the system comprises multiple radiant heat transfer panels (16), each of the panels having a thermal mass (18) and a conduit channel (20); a fluid conduit (21), the conduit communicating with an apparatus (23) for heating fluid (22) in the conduit; the multiple panels positioned adjacent each other such that the conduit extends through a series of the conduit channels; the panels, conduit and apparatus so configured and arranged to permit heat transfer from the fluid to the thermal mass of the panel, whereby heat radiates from the panel. The present invention also discloses a radiant heat transfer panel for engagement with a fluid conduit comprising: a formed tray (24); the tray defining a thermal volume (17) and a conduit channel; the volume containing a thermal mass; and the channel, volume and thermal mass configured and arranged to permit heat transfer between the conduit and the thermal mass. The invention also discloses a method for installing a modular radiant heat panel system comprising the steps of: providing an under-layer having a given area (44); providing multiple panels having a thermal mass and a conduit channel; providing conduit; position the conduit over or under the under-layer in a predetermined pattern; and positioning the panels on or under the under-layer such that the conduit extends through at least a portion of the conduit channel of the panels.

8 Claims, 16 Drawing Sheets